(12) United States Patent
Nix

(10) Patent No.: US 11,838,417 B2
(45) Date of Patent: Dec. 5, 2023

(54) SUBSCRIPTION CONCEALED IDENTIFIER (SUCI) SUPPORTING POST-QUANTUM CRYPTOGRAPHY

(71) Applicant: John A Nix, Evanston, IL (US)

(72) Inventor: John A Nix, Evanston, IL (US)

(*) Notice: Subject to any disclaimer, the term of this patent is extended or adjusted under 35 U.S.C. 154(b) by 95 days.

(21) Appl. No.: 17/361,124

(22) Filed: Jun. 28, 2021

(65) Prior Publication Data
US 2021/0409214 A1    Dec. 30, 2021

Related U.S. Application Data

(60) Provisional application No. 63/046,169, filed on Jun. 30, 2020.

(51) Int. Cl.
*H04L 9/30* (2006.01)
*H04L 9/08* (2006.01)

(52) U.S. Cl.
CPC .............. *H04L 9/304* (2013.01); *H04L 9/085* (2013.01); *H04L 9/0844* (2013.01)

(58) Field of Classification Search
None
See application file for complete search history.

(56) References Cited

U.S. PATENT DOCUMENTS 9,912,479 B1 *  3/2018  Yamada .................. H04L 9/002
10,530,575 B2    1/2020  Nix
11,076,288 B2 *  7/2021  Torvinen ............... H04W 12/06
2020/0068391 A1 *  2/2020  Liu ........................ H04L 63/162
2021/0320788 A1 * 10/2021  Kang ..................... H04L 9/3271

FOREIGN PATENT DOCUMENTS

CN       111669748 A   *  9/2020
CN       114008967 A   *  2/2022   ........... H04L 9/0844
WO   WO-2019161961 A1  *  8/2019   ............. H04W 8/18
WO   WO-2020168275 A1  *  8/2020   ........... H04W 48/08
(Continued)

OTHER PUBLICATIONS

Liu et al. .; polarRLCE: A New Code-Based Cryptosystem Using Polar Codes; Wiley' Dec. 26, 2019; pp. 1-11 (Year: 2019).*
(Continued)

*Primary Examiner* — Saleh Najjar
*Assistant Examiner* — Shadi H Kobrosli
(74) *Attorney, Agent, or Firm* — GrowIP Law Group LLC

(57) ABSTRACT

A device and a network can authenticate using a subscription concealed identifier (SUCI). The device can store (i) a plaintext subscription permanent identifier (SUPI) for the device, (ii) a network static public key, and (iii) a key encapsulation mechanism (KEM) for encryption using the network static public key. The network can store (i) a device database with the SUPI, (ii) a network static private key, and (iii) the KEM for decryption using the network static private key. The device can (i) combine a random number with the SUPI as input into the KEM to generate a ciphertext as the SUCI, and (ii) transmit the ciphertext/SUCI to the network. The network can (i) decrypt the ciphertext using the KEM to read the SUPI, (iii) select a key K from the device database using the SUPI, and (iv) conduct an Authentication and Key Agreement (AKA) with the selected key K.

15 Claims, 7 Drawing Sheets

(56) References Cited

FOREIGN PATENT DOCUMENTS

| WO | 2020223319 | 11/2020 |
| WO | 2021007235 | 1/2021 |

OTHER PUBLICATIONS

J. Bos et al., "CRYSTALS—Kyber: A CCA-Secure Module-Lattice-Based KEM," 2018 IEEE European Symposium on Security and Privacy (EuroS&P), 2018, pp. 353-367, doi: 10.1109/EuroSP.2018.00032. (Year: 2018).*

Lipp, Benjamin; An Analysis of Hybrid Public Key Encryption; INRIA Paris; Feb. 23, 2020; pp. 1-23 (Year: 2020).*

Liu et al.; polarRLCE: A New Code-Based Cryptosystem Using Polar Codes; Wiley' Dec. 16, 2019; pp. 1-11 (Year: 2019).*

ETSI; Security architecture and procedures for 5G System (3GPP TS 33.501 version 15.2.0 Release 15); pp. 1-172 (Year: 2018).*

Wikipedia, "Post-Quantum Cryptography Standardization", Apr. 8, 2020.

GSM Association, "iUICC POC Group Primary Platform requirements", Release 1.0, May 17, 2017.

ETSI Technical Standard 103 465 v.15.0.0, "Smart Cards; Smart Secure Platform (SSP); Requirements Specification", May 2019.

ETSI Technical Standard 133 501 v.15.4.0, "5G; Security architecture and procedures for 5G System", May 2019.

Internet Engineering Task Force (IETF) Request for Comments (RFC) 7542, "The Network Access Identifier", May 2015.

* cited by examiner

Figure 1c

Device Database 101d

| Row | NAI User Name 101u | Network ID 103a | K.Device 101k | ID.K.Device 101i | MNO Parameters 102g | Device Certificate 101c | PK-ENC Network 101e | ENC. Parameters 101f | Random 101n |
|---|---|---|---|---|---|---|---|---|---|
| 1 | 101u-1 | 103a-1 | 101k-1 | 101i-1 | 102g-1 | 101c-1 | 101e-1 | 101f-1 | 101n-1 |
| 2 | 101u-1 | 103a-1 | 101k-2 | 101i-2 | 102g-2 | 101c-1 | 101e-1 | 101f-1 | 101n-2 |
| 3 | 101u-1 | 103a-2 | 101k-3 | 101i-3 | 102g-3 | 101c-1 | 101e-2 | 101f-2 | 101n-3 |
| 4 | 101u-2 | 103a-2 | 101k-1 | 101i-1 | 102g-1 | 101c-2 | 101e-2 | 101f-2 | 101n-4 |
| 5 | 101u-2 | 103a-2 | 101k-1 | 101i-1 | 102g-1 | 101c-1 | 101e-3 | 101f-3 | 101n-5 |
| 6 | 101u-3 | 103a-4 | 101k-4 | 101i-4 | 102g-4 | 101c-4 | 101e-4 | 101f-4 | 101n-6 |
| 7 | 101u-4 | 103a-4 | 101k-4 | 101i-4 | 102g-4 | 101c-4 | 101e-4 | 101f-4 | 101n-6 |

Network Database 103d

| Time | Device | Device ID / SUCI 101b | Device ID / SUPI 101a | PK-ENC Network 101e | SK-ENC Network 103b | ENC. Parameters 101f | K.Device 101k | ID.K.Device 101i | Shared Secret M 401 | Auth Algorithm 101q | Auth Vectors 103x |
|---|---|---|---|---|---|---|---|---|---|---|---|
| 0 | 1 | | 101a-1 | 101e-1 | 103b-1 | 101f-1 | 103k-1 | 103i-1 | | AKA | 103x-1 |
| 0 | 1 | | 101a-1 | 101e-2 | 103b-2 | 101f-1 | 103k-1 | 103i-1 | | AKA | 103x-1 |
| 0 | 1 | 101b-1 | 101a-1 | 101e-1 | 103b-1 | 101f-1 | 103k-2 | 101i-2 | 401-1 | AKA | 103x-2 |
| 0 | 1 | 101b-1 | 101a-1 | 101e-1 | 103b-3 | 101f-1 | 103k-1 | 101i-1 | 401-2 | AKA' | 103x-3 |
| 2 | 2 | 101b-2 | 101a-2 | 101e-2 | 103b-1 | 101f-1 | 103k-2 | 101i-2 | | EAP-TLS | |
| 1 | 2 | 101b-2 | 101a-2 | 101e-2 | 103b-1 | 101f-1 | 103k-3 | 101i-3 | 401-2 | EAP-TLS | 103x-1 |
| 3 | 3 | 101b-3 | 101a-3 | 101e-3 | 103b-3 | 101f-2 | 103k-4 | 101i-4 | 402-3 | AKA | 103x-4 |
| 4 | 4 | 101b-4 | 101a-4 | 101e-3 | 103b-3 | 101f-2 | 103k-5 | 101i-5 | 402-4 | AKA' | 103x-5 |

SUBSCRIPTION CONCEALED IDENTIFIER (SUCI) SUPPORTING POST-QUANTUM CRYPTOGRAPHY

CROSS REFERENCE TO RELATED APPLICATIONS

The present application claims priority to U.S. Provisional Application No. 63/046,169 filed Jun. 30, 2020, which is herewith incorporated by reference into the present application.

BACKGROUND

Technical Field

The present systems and methods relate to devices and wireless networks using concealed subscription identifiers in order to conduct authentication and key agreement, and more particularly to using keys and algorithms supporting post-quantum cryptography in order to improve efficiency, increase flexibility, and enhance security of subsequent communications based on the concealed subscription identifiers.

Description of Related Art 5G standalone networks have introduced the commercial use of a "Subscriber Concealed Identifier" (SUCI), where the long-term permanent identifier for the subscriber or device, such as the traditional "International Mobile Subscriber Identity" (IMSI) is not transmitted as plaintext but rather as ciphertext. The solution used by 5G networks as of June 2020 is described in "Annex C: Protection schemes for concealing the subscription permanent identifier" with the document "ETSI TS 133 501 V15.4.0 (2019 May)" titled "5G; Security architecture and procedures for 5G System", which is herein incorporated by reference in its entirety and also referred to herein as "Annex C of ETSI TS 133 501". The transmission of a ciphertext value for a user or device identity creates challenges, since key material for authentication normally needs to be selected based upon an identity for a device.

The security of using a SUCI and the related encryption schemes defined by current 5G standards depends on the security of elliptic curve cryptography (ECC), and specifically elliptic curve Diffie-Hellman key exchanges (ECDH). A device generating a SUCI uses a long-term, static public key associated with a wireless network. However, long-term, static ECC public keys are at a significant risk of being "broken" over the coming decade by quantum computers, such that a private key could be determined based on the public key. Devices deployed over the next few years using 5G technology may remain operational for more than a decade. As one example, millions of 2G devices and SIM cards deployed more than a decade ago are currently still used worldwide. Consequently a need exists in the art for security and encryption protocols to remain secure for more than a decade, when quantum computing may feasibly break traditional or classical PKI algorithms and key exchanges. A need exists in the art for a device and network to use a SUCI in a manner that supports post-quantum cryptography, instead of the traditional ECC algorithms specified for a SUCI with current 5G standards.

Although the use of ECC algorithms are included in many different protocols and standards, quantum computers are expected to be able to solve the elliptic curve discrete logarithm problem (for ECC algorithms) in polynomial time, while classical computers solve the problem in exponential time. As of early 2020, estimates for the number of qubits required to break a 256 bit ECC public key to determine the private key with a reasonable computation time are approximately 2000-4000 qubits. Industry projections of the number of qubits for operating quantum computers shows this number of qubits could be available for a computing device in approximately 5 to 10 years and likely within 15 years. Consequently, a need exists in the art for the generation and use of a SUCI by a device and a network that is resistant to quantum computers. A need exists in the art for both the device and the network to support post-quantum cryptographic algorithms in order to keep both the SUCI and also the subscriber permanent identifier secured against quantum computers.

The National Institute of Standards and Technology (NIST) is currently conducting a project for Post-Quantum Cryptography (PQC) Standardization. The field of post-quantum cryptography continues to develop with proposed algorithms currently undergoing revisions for standardization as of May 2020. In general, the leading candidates for post-quantum cryptography key exchange or "key encapsulation mechanisms" (KEM) propose using lattice, multivariate, or code-based, algorithms. These proposed algorithms are described by the Wikipedia article for "Post-Quantum Cryptography" dated Apr. 7, 2020, which is hereby incorporated by reference. MST supported standards for quantum-safe cryptographic algorithms are expected to be published around 2024. A need exists in the art for a SUCI to be secured with industry standard cryptographic algorithms, such as at least one of the proposed candidates from Round 2 of the NIST PQC.

Although Round 2 of the NIST PQC project proposes multiple algorithms believed or expected to be "quantum safe" slight adjustments or changes to the algorithms may be required in order to efficiently use the algorithms with a SUPI in order to generate a SUCI. As one example, the KEM have been designed to expect that a shared secret, such as a 256 bit random number, would be encrypted with a public key. A shared secret such as for a session between a device and a server would normally be temporary and periodically change. However, for a device the SUPI for encryption into a SUCI may remain relatively constant for the lifetime of the device, which could reduce security of the SUCI using conventional technology PQC asymmetric encryption to encrypt device identities. In other words, simply encrypting a SUPI into a SUCI using PQC asymmetric encryption would result in the same SUCI value, which means the device could be tracked. Consequently, a need exists in the art for a device and a network to use PQC algorithms in a manner that supports the secure encryption of the SUPI without allowing third parties to track the device generating the SUCI from the SUPI. A need exists in the art for the device to generate the SUCI from the SUPI in a manner that prevents "leaking" information to a third party (e.g. other than device or the network) which could observe the SUCI transmitted over the air via wireless networks.

Other networking technologies and protocols for secure transmission of data through the Internet can benefit from encryption of an identity for a device sending data through Internet (or intranet) to a server on a network. In general, a device and a server that desire to implement a symmetric ciphering algorithms such as the advanced encryption standard (AES) need to agree on a commonly shared secret key for encryption and decryption. Most secure systems for device security rely on separate devices using separate shared secret keys (e.g. keys that are unique per device). In order for a server to select the correct shared secret key for decryption for the correct device, the server should be able to identify the device. But, the device transmitting an identity in the clear reduces security since activities for the device could then be tracked. That condition and situation is essentially the same problem addressed by 3GPP with the introduction of the SUCI for 5G networks (instead of transmitting IMSI with 3G and 4G networks). A need exists in the art for devices to securely transmit their identity (or a key identity for symmetric encryption) over packet switched networks and supporting post-quantum cryptography, such that a server receiving the identity can select the proper shared secret for symmetric ciphering with the device.

Commercial wireless networks based on 4G and 5G standards as of June 2020 implement security using shared secret keys, such as a pre-shared secret key K or Ki, with a length of 128 bits. The resulting ciphering algorithms have a corresponding security level of approximately 128 bits. Quantum computers can reduce the security of symmetric ciphering algorithms with 128 bit keys to approximately 64 bits. Consequently, study and potential plans are being evaluated by ETSI for the migration from 128 bit keys to 258 bit long keys for the shared secret keys. This migration can create a significant challenge for both devices and networks to support the migration, where some networks and devices may only support 128 bit keys, while other devices and network may support and prefer the use of 256 bit long keys. One problem created by established standards is the shared secret key K is uniquely bound to a subscription identity such as an IMSI.

Thus, with conventional technology a device would have to use a first IMSI with a first key K of 128 bits length and a second IMSI with a second key K with 256 bits length (since the IMSI is uniquely bound to the shared secret key). A need exists in the art for devices and networks to support devices using a single device identifier, such as an IMSI or a user name within a NAI, where the device can use either (i) a first key K of 128 bits or (ii) a second key K of 256 bits. A need exists in the art for the device and network to use an identifier for either key, such that the key with the key length supported by the network could be specified by one of the device or the network. A need exists in the art for the identifier of different shared secret keys (such as either the 128 or 256 bit long keys) to be securely communicated between the device and the network. A need existing in the art such that the identifier of the shared secret key is not transmitted as plaintext in the clear over wireless networks, such that listening devices to unencrypted messages could track a device based on the identity of a shared secret key transmitted as plaintext.

The rapid growth for connecting intelligent sensors or small "Internet of Things" devices to 5G networks creates challenges for traditional AKA authentication based on pre-shared secret keys and identities such as IMSI. A primary challenge is pre-configuring the devices with both an IMSI and the pre-shared secret key for the network. 5G standards have included the use of EAP-AKA authentication and security (identified as AKA' in 5G standards), traditional AKA with pre-shared secret keys, and also support for EAP-TLS authentication and security. The optimal selection of an authentication protocol by the network can depends on the secure receipt of data from the device, in addition to a device identifier, in order to determine the preferred authentication protocol. A need exists in the art for the device to securely transmit device data supporting PQC algorithms before the network selects an authentication protocol. A need exists in the art for the network to use the secured device data, such as a device certificate or device configuration, in order to select an authentication protocol. A need exists in the art for a network to select an authentication scheme (e.g. AKA, AKA', or EAP-TLS) for the device based on encrypted plaintext data transmitted along with a SUCI.

Many other examples exist as well for needs in the art for devices and wireless networks to mutually authenticate using subscriber concealed identifiers (SUCI) in a manner secured against quantum computers, and the above are examples are just a few and intended to be illustrative instead of limiting.

SUMMARY

Methods and systems are provided for a device, a mobile network operator (MNO), and a network to establish secure communications based on concealed subscription identifiers transmitted from the device to a wireless network. A system can include a plurality of devices, a mobile network operator, a network, and a device provider. The device can record a subscriber permanent identifier (SUPI), a shared secret key K, an identity for the shared secret key K, a post-quantum cryptography (PQC) encryption algorithm or key exchange mechanism (KEM), a device certificate, a network static public key for the PQC algorithm, MNO parameters, and cryptographic algorithms and cryptographic parameters used with PQC algorithms and also symmetric ciphering. The subscriber permanent identifier can comprise a network access identifier (NAI) supporting IETF RFC 7542, where the NAI can include a user name and a realm. The user name can comprise an IMSI in exemplary embodiments. The realm can comprise at least a portion with a network identity. The device can operate a tamper resistant element (TRE) that can include a primary platform (PP). The device can record keys and identities and cryptographic data within a device database. The device database could be stored within the TRE and PP.

The device can be a computing device for connecting with wireless networks such as a 5G network or a Wi-Fi network and the device can include a radio. The device can include a processor, memory, a user interface, and a bus connecting the components within an enclosure. The device could comprise a radio module within a larger device, such as a radio module within an automobile, industrial equipment, a mobile handset such as a smart phone, and other possibilities exist as well for physical embodiments of the device. The device can use PQC algorithms and at least the network static public key in order to convert a SUPI into a SUCI, using either (i) asymmetric encryption of at least the user name, or (ii) the KEM to derive a mutually shared secret key and then encrypt at least the user name into a ciphertext for the SUCI using the mutually shared secret key. A device could also encrypt additional data pertaining to the device when generating the SUCI, such as encrypting an identity for a shared secret key K or a certificate for the device.

The mobile network operator can comprise a wireless network with geographically distributed radios and antennas in order to wirelessly connect with the plurality of devices. The MNO can include a MNO identity in order to uniquely identify the MNO, such as including a mobile country code and a mobile network code. The MNO can transmit broadcast messages to the device before the device transmits a SUCI to the MNO. The broadcast messages can include MNO parameters, where the device can use the MNO parameters in the generation of the SUCI. The device can use the MNO parameters broadcast to select the additional data encrypted by the device along with the SUCI for transmission back to the MNO. The MNO can receive messages from the device through a wireless network and forward the messages to the network. The MNO can receive messages from the network and forward the messages to the device through the wireless network. The MNO can establish a secure session through an IP network with the network.

The network can include a plurality of servers operating in a coordinate manner to support communications with a device. The plurality of servers for the network can comprise a server system. The network can include an authentication server function (AUSF) and a network database. The network can include an identity comprising the network identity in at least a portion of a realm for the device subscriber permanent identifier. The network can operate a network database storing data for the plurality of devices. The network can record or store a network static private key for the network static public key, the subscriber permanent identifier, the shared secret key K for the device, an identity for the shared secret key K, a post-quantum cryptography (PQC) decryption algorithm or key exchange mechanism (KEM) using the network static private key, and cryptographic algorithms and cryptographic parameters used with at least the PQC cryptographic algorithms.

The network can use the PQC algorithms in order to convert a SUCI into a SUPI, using either (i) asymmetric decryption of at least the user name for the device, or (ii) the KEM with the device to derive a mutually shared secret key and then decrypt at least the device user name into a plaintext value for the SUPI. A server could also decrypt additional data pertaining to the device when generating the SUPI, such as decrypting an identity for a shared secret key K or a certificate for the device.

After decryption of the SUCI and also any associated device data, such as an identity for the shared secret key K or the certificate for the device, the network can use the SUPI and associated device data to select and conduct subsequent authentication and key agreement protocol steps with the device. The network can conduct any of AKA protocols (such as traditional 5G AKA), EAP-AKA protocols (identified as AKA' in 5G standards), or an EAP-TLS authentication with the device through the MNO. The network can operate the network database for storing data associated with each of the plurality of different devices connecting with the network through the MNO.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1c is an illustration of a device database and a network database with exemplary data stored or recorded, in accordance with exemplary embodiments;

DETAILED DESCRIPTION OF EXEMPLARY EMBODIMENTS OF THE INVENTION

FIG. 1a

Figure 1A:
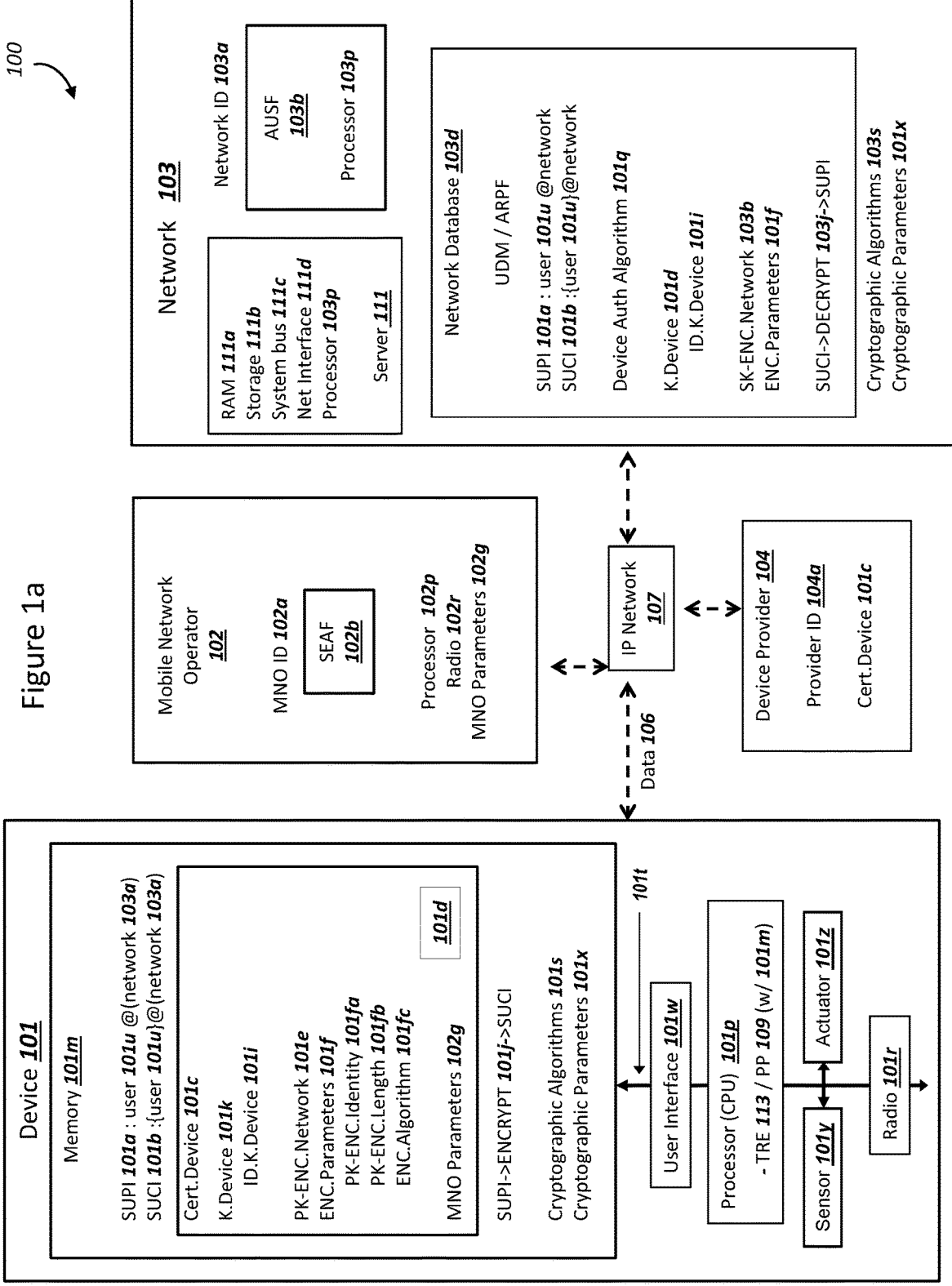
FIG. 1a is a graphical illustration of an exemplary system, where a device communicates data with a mobile network operator and a network in order to mutually authenticate and secure communications with the network, in accordance with exemplary embodiments.

FIG. 1a is a graphical illustration of an exemplary system, where a device communicates data with a mobile network operator and a network in order to mutually authenticate and secure communications with the network, in accordance with exemplary embodiments. The system 100 can include a device 101, a mobile network operator 102, a network 103, and a device provider 104. The depicted nodes or entities can communicate data 106 over an Internet Protocol (IP) network 107. Although a single device 101, a single mobile network operator 102, a single network 103, and a single device provider 104 are depicted in FIG. 1, a system 100 can comprise a plurality of each of the depicted nodes or entities. A system 100 as depicted in FIG. 1 can support either (i) an Authentication and Key Agreement (AKA) protocol such as, but not limited to, the AKA protocol specified for 5G wireless networks in TS 133 501 V15.1.0, or (ii) EAP-TLS authentication for wireless WAN networks, such as supporting EAP-TLS authentication as described in Annex B of TS 133 501 V15.1.0. Other wireless networking technologies and authentication protocols for device 101 and MNO 102 could be supported as well.

Device 101 and mobile network operator 102 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and mobile network operator 102 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used by device 101 and mobile network operator 102 without departing from the scope of the present disclosure.

Mobile network operator 102 and network 103 can connect to the IP network 107 and communicate with each other via a wired connection such as, but not limited to, an Ethernet connection, or a fiber optic connection. In other words, mobile network operator 102 can connect to (i) device 101 through wireless technology and (ii) a network 103 using wired technology. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for IP Network 107 and a private network between mobile network operator 102, network 103, and device provider 104 exist as well without departing from the scope of the disclosure.

Mobile network operator (MNO) 102 can include a plurality of radio-frequency (RF) access technologies (RAT) systems for supporting wireless communications with a plurality of devices 101 in a networked manner, including through the use of geographically dispersed antennas, radio nodes, or towers. The RAT systems for MNO 102 can include a radio 102*r* for communicating with device 101, where radio 102*r* includes an antenna system and can operate through licensed radio spectrum. In exemplary embodiments, MNO 102 can operate a plurality of radios 102*r* which are connected to an IP network 107 in a secure manner, including connecting via a private IP network.

In exemplary embodiments, mobile network operator 102 can comprise traditional public land mobile networks providing data and voice services such as AT&T, Verizon, T-Mobile, Sprint, etc, and provide data communications services through a variety of radio access technologies. Further, although FIG. 1*a* depicts an MNO 102 as communicating with device 101 with a radio 102*r*, another entity besides a mobile network operator could perform the function of MNO 102. For embodiments where radio 101*r* for device 101 uses WiFi technology, then MNO 102 could comprise an entity other than a PLMN, such as a service or network that operates a plurality of WiFi access points. The function of MNO 102 could also be conducted by a large enterprise with a collection of geographically distributed WiFi access points.

Each of mobile network operator (MNO) 102 and network 103 could operate a plurality of servers in order to support the communications and connectivity depicted in FIG. 1*a* and additional Figures below. The exemplary data structures, values or numbers, and steps for a MNO 102 and network 103 in FIG. 1*a* and additional Figures below could be recorded and/or conducted by a collection of servers for each entity. Exemplary servers for a mobile network operator 102 and network 103 in system 100 can be either different physical computers such as rack-mounted servers, or different logical or virtual servers or instances operating in a "cloud" configuration.

An exemplary server or collection of servers for MNO 102 can comprise a Security Anchor Function (SEAF) 102*b*, where a MNO 102 can include at least one SEAF 102*b* for establishing secure and authenticated communications with device 101 through at least one radio 102*r*. The SEAF 102*b* could comprise and operate according to the European Technical Standards Institute (ETSI) standard TS 133 501 V15.1.0 from August of 2018 and titled "5G; Security architecture and procedures for 5G System", which is hereby incorporated by reference in its entirety. In exemplary embodiments, the SEAF 102*b* for MNO 102 can receive keys such as an anchor key from network 103 in order to establish secure and authenticated communication with device 101. MNO 102 could receive the keys from network 103 after network 103 conducts authentication and key agreement with device 101. In exemplary embodiments where Extensible Authentication Protocol-Transport Layer Security (EAP-TLS) in a system 100, then SEAF 102*b* could operate as specified in section 6.1.1.2 of TS 133 501 V15.1.0, where "the SEAF takes the role of pass-through authenticator."

Note that MNO 102 could use other wireless networking technologies besides 5G. Thus, although an SEAF 102*b* is depicted in FIG. 1*a*, a different collection of servers or an entity besides a SEAF 102*b* could perform the steps for a MNO 102 depicted in FIG. 2 below, without departing from the scope of the present invention. In general, the function of an SEAF 102*b* as depicted and described in connection with FIG. 2 below could be conducted by at least one server or process operating within a cloud computing environment, where the server or process may not be an SEAF 102*b*. For example, the server or process operating with equivalent functionality as an SEAF 102*b* in FIG. 2 below could (i) receive a partially encrypted Network Access Identifier (NAI) such as a SUCI 101*b* from device 101 with an encrypted user name and a plaintext realm for the NAI, and (ii) use the plaintext realm to forward the SUCI 101*b* to network 103, where network 103 uses or is associated with at least a portion of the plaintext realm.

MNO 102 can include a MNO identity 102*a*, where MNO identity 102*a* can comprise the combination of a mobile country code and a mobile network code, according to 3GPP standards for 4G networks, 5G networks, etc. As one example, MNO identity 102*a* for an example network of AT&T could comprise an MCC number of 310 and a MNC number of 410, such that the MNO identity 102*a* can be 310410. Note that a MNO 102 can operate with multiple MNO identities 102*a*, and a MNO identity 102*a* could also comprise a Domain Name Service (DNS) name such as an exemplary value of "att.net", and other possibilities exist for a MNO identity 102*a* without departing from the scope of the present invention. In addition, a MNO 102 could operate with a plurality of MNO identities 102*a*.

MNO 102 can include a plurality of processors 102*p* in order to store and record data as well as communicate within a system 100 over an IP network 107 and a radio 102*r*. Processor 102*p* can comprise a general purpose processor appropriate for the computational requirements for a MNO 102, and may operate with multiple different processor cores, including field programmable gate arrays (FPGA). A processor 102*p* can comprise exemplary ARM® based processors or an Intel® based processor such as belonging to the XEON® family of processors, and other possibilities exist as well. Processor 102*p* can utilize a data bus to fetch instructions from memory or storage within a server and operate on the instruction. A processor 102*p* can include components such as registers, accumulators, and logic elements to add, subtract, multiply, and divide numerical values and record the results in memory. In exemplary embodiments, at least one processor 102*p* within MNO 102 can be used with an SEAF 102*b* to conduct the steps for MNO 102 and send/receive messages for MNO 102 as depicted and described in connection with FIG. 2 below. Although not depicted in FIG. 1, MNO 102 can include memory and at least one database in order to establish communications with a plurality of devices 101 through a plurality of radios 102*r*.

Device 101 can be a computing device for sending and receiving data using a radio 101*r*. Device 101 can take several different embodiments, such as a general purpose personal computer, a mobile phone or mobile handset based on the Android® or Fuchsia from Google® or the IOS operating system from Apple®, a tablet, a device with a sensor or actuator for the "Internet of Things", a module for "machine to machine" communications, a device that connects to a wireless Wide Area Network (WAN) operated by MNO 102, a router, and/or a server, and other possibilities exist as well for the embodiments of a device 101 without departing from the scope of the present invention.

The electrical components within device 101 can include a memory $101m$, a processor $101p$, a radio $101r$, a sensory $101y$, an actuator $101z$, and a user interface $101w$. As depicted in FIG. 1a, a data bus $101t$ or a system bus $101t$ could internally electrically connect the depicted components within a device 101. Additional components to support the operation of device 101 can include a battery to store electrical power, and an antenna to transmit and receive RF signals. The sensor $101y$ can collect data external or internal to the device 101, such as temperature, motion, position, pressure, etc. A device 101 could also include the actuator $101z$ to convert electrical signals into physical actions, such as a motor for moving components, a relay for opening or closing a circuit, a speaker for outputting sound, etc.

Memory $101m$ can comprise combinations of (i) volatile random access memory and nonvolatile memory. The volatile memory can include random access memory (RAM) for relatively fast read and write operations compared to nonvolatile memory, such as SRAM or DRAM. RAM for memory $101m$ could also include persistent RAM or nonvolatile RAM (NVRAM), such that data in a persistent RANI memory or nonvolatile RAM is stored when power is removed. Nonvolatile memory can include storage memory such as a flash memory and record or store data when power is removed from device 101. In general, different forms and electrical components for memory $101m$ can be used without departing from the scope of the present disclosure. Processor $101p$ can comprise a central processing unit (CPU) or a "system on a chip" and be similar to a processor $102p$ for a MNO 102 described above, but with reduced capabilities for a device 101 compared to a processor $102p$ for MNO.

Tamper resistant element (TRE) 113 can comprise a tamper resistant element as described in the GSMA PP Requirements document, titled "iUICC POC Group Primary Platform requirements", Release 1.0 dated May 17, 2017, which is hereby incorporated by reference in its entirety ("GSMA PP Requirements"). TRE 113 can also comprise the secure element as described in the ETSI SSP Requirements document ETSI TS 103 465 V15.0.0 (2019 May) titled "Smart Cards; Smart Secure Platform (SSP); Requirements Specification" ("ETSI SSP Requirements"), which is hereby incorporated by reference in its entirety. Tamper resistant element 113 can comprise a silicon enclave within a tamper resistant chip such as a "system on chip" operating within processor $101p$. In addition, processor $102p$ for a MNO 102 and processor $103p$ for network 103 can include a TRE and primary platform 109.

TRE 113 can include a primary platform (PP) 109, where a primary platform is also described in both the GSMA PP Requirements document and the SSP Requirements document. TRE 113 could also comprise a "Smart Secure Platform" (SSP) as described in the SSP Requirements document, such as the SSP depicted in FIG. 2 of the "Architecture" section 9.2.1. Primary platform 109 can comprise a secure operating environment, a secure enclave, a secure element, and include a dedicated processing core within a processor for device 101. Primary platform 109 can also operate in a Trusted Execution Environment (TEE) within a processor for device 101. Primary platform 109 can also comprise a SSP as contemplated by ETSI documents and draft specifications for 5G networks.

TRE 113 and PP 109 can support a variety of applications. TRE 113 can comprise the physical device such as that depicted in FIG. 1a, and a primary platform 109 can comprise a secure processing environment operating within the TRE 113. With appropriate configured secondary platform bundle, TRE 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 101, a virtual key for cars or door locks, an secure environment for recording an identity and secret or private keys for drivers licenses, passports, online or web-site access, etc.

In exemplary embodiments, the steps conducted by device 101 to convert a SUPI $101a$ into a SUCI $101b$ are conducted by a secondary platform bundle operating within a primary platform that operates on the physical host of a TRE 113. The exemplary memory $101m$ can be stored within the TRE 113. For these embodiments, the TRE 113 can function as a SIM card or eUICC and the authentication steps such as those depicted in FIG. 1a and FIG. 1b by the device can be conducted by the TRE 113.

Other applications for firmware operating in TRE 113 and PP 109 in order to encrypt an identity are possible as well, without departing from the scope of the present disclosure. In general, cryptographic keys and cryptographic algorithms and parameters could be stored in PP 109 in order to securely support applications such as device programs operating on device 101. In this manner, an insecure device program also operating on device 101 would not feasibly be able to ready the cryptographic keys or use the cryptographic algorithms stored in PP 109.

Device 101 may include radio $101r$ support radio-frequency (RF) communications with networks including a MNO 102 via standards such as GSM, UMTS, mobile WiMax, CDMA, LTE, LTE Advanced, 5G, and/or other mobile-network technologies. In a wireless configuration, the radio $101r$ may also provide connectivity to local networks such as 802.11 WLAN, Bluetooth, Zigbee, or an IEEE 802.15.4 network, among other possibilities. In exemplary embodiments, a radio $101r$ is connected to an antenna, which could be either internal to device 101 or external to device 101.

Note that device 101 may also optionally include user interface $101w$ which may include one or more devices for receiving inputs and/or one or more devices for conveying outputs. User interfaces are known in the art and thus user interfaces are not described in detail here. User interface $101w$ could comprise a touch screen if device 101 operates as a smartphone or mobile phone. Device 101 can optionally omit a user interface $101w$, since no user input may be required for many M2M applications such as networked sensors, although a user interface $101w$ could be included with device 101. LED lights or a display of LEDs could also comprise a user interface $101w$.

Device 101 can include a device identity comprising a subscriber permanent identity (SUPI) $101a$. The device identity can comprise a string or number to uniquely identify device 101 with MNO 102 and network 103, and potentially other nodes connected to the IP network 107. A device identity of a SUPI $101a$ can include a network access identifier (NAI) according to IETF RFC 7542, titled "The Network Access Identifier", which is herein incorporated by reference in its entirety. A NAI can consist of different portions, such as a user identity, and a realm. The user identity can comprise a number or a string to uniquely identify device 101 within a realm. A NAI for a SUPI 101a can have many forms, and with several examples for a NAI are included in RFC 7542. Other possibilities exist as well for a NAI as a SUPI 101a for an identity of device 101 without departing from the scope of the present invention. The use of a SUPI 101a in an NAI format as a device identity for device 101 is not required for some exemplary embodiments, and for some embodiments the SUPI 101a could be a single string with an embedded user identity and realm but without the "@" character standard for a NAI.

As depicted in FIG. 1a, in exemplary embodiments, a SUPI 101a can have a user identity and a realm (depicted as "network 103a"), where the realm can have a prefix and a suffix. The prefix and the suffix can have multiple portions or more than one portion. In general, (i) a realm suffix can include a base string of a domain name associated with a network 103 (depicted as "network" for SUPI 101a in FIG. 1a), and (ii) a realm prefix can include a second string associated with a device provider 104. In exemplary embodiments, the realm prefix can include at least a portion of a network identity 103a. Note that a realm could also include data or a name for MNO 102, which could include a MNO ID 102a, such as using the MNO ID 102a in a prefix for the realm. Other embodiments of a SUPI 101a for a device 101 than that depicted in FIG. 1a could include exemplary values of "user@network.provider" (e.g. a prefix first portion of the realm includes a name for the network 103 and a suffix second portion of the realm includes a name for the device provider).

In preferred embodiments, a device 101 with a user identity of "XXXXX" could have be associated with a device provider with the name "Company", where the company has a commercial agreement and technical agreement with a cloud service such as Amazon Web Services to operate the authentication server function (AUSF) 103b, such that devices 101 for the company (e.g. a device provider) could roam and/or be authenticated with a plurality of mobile network operators. The cloud service could have commercial and technical agreements with a plurality of mobile network operators, including MNO 102 depicted in FIG. 1. The cloud service could have an exemplary network ID 103a of aws.com. For this exemplary embodiment described in this paragraph, the SUPI 101a for device 101 could comprise an example string of "XXXXX@company.aws.com". Note that an identity of MNO 102 such as MNO ID 102a may not need to be included in SUPI 101a, and MNO 102 can select network 103 based on the suffix of the realm (e.g. aws.com). In another embodiment, the MNO 102 identity could be included in the realm, where the MNO ID 102a could be "att.com", and the SUPI 101a for device 101 could be "XXXXX@company.aws.att.com". Other possibilities exist as well without departing from the scope of the present invention.

Although not depicted in FIG. 1a, a NM as a SUPI 101a could comprise a string where realm has an identity of the network 103a in the prefix and an identity of a device provider in the suffix. Or, the realm could comprise a single base string that is unique for a combination of an identity of a device provider and network 103a (such as a realm of "company-aws.com"). Further, in some exemplary embodiments, the realm of a NAI for SUPI 101a could omit an identity for a device provider and consist only of an identity for network 103 of network ID 103a. In general, the realm of a SUPI 101a can include sufficient identifying information (such as at least a portion of network ID 103a in order for data within a message from device 101 to be (i) received by MNO 102 and forwarded to network 103.

A device 101 can also include a subscriber concealed identity (SUCI) 101b. SUCI 101b can include an encrypted identity of a user name or user identity, depicted as "{user}" in FIG. 1a and the plaintext realm, where exemplary formats or contents of a realm were depicted and described in the two paragraphs above. With conventional technology, such as in Annex C of ETSI TS 133 501, a SUCI 101b can be derived from a SUPI 101a using an elliptic curve integrated encryption scheme. In exemplary embodiments, device 101 communicates with a MNO 102 using a SUCI 101b as the identity for device 101 instead of the SUPI 101a, in order for the user identity of device 101 to be encrypted. Note that with conventional technology for a SUCI 101b, the SUCI 101b is symmetrically encrypted with a shared secret key that is mutually derived by the device 101 and the network 103 using the ECIES.

With the technology depicted and described in connection with FIG. 1b below and also FIG. 2, the device can asymmetrically encrypt at least the user portion of the NAI in a SUPI 101a (or alternatively an IMSI for the device) with a public key. In some embodiments, the realm portion of the NAI in a SUCI 101b can remain plaintext, such that wireless network 102 can read the plaintext realm for the SUCI 101b in order to select and forward the SUCI 101b to a network 103 and/or device provider 104. With the technology depicted an described in connection with FIG. 4 and FIG. 5 below, the device can conduct a PQC KEM with the network 103 in order to derive a shared secret key and then encrypt at least the user portion of the NAI using the shared secret key.

In summary, conventional technology for converting a SUPI 101a into a SUCI 101b comprises (i) storing a device identity a network static public key, (ii) deriving an device ephemeral PKI key pair, (iii) conducting a key exchange with the device ephemeral private key and network static public key to derive a shared secret, (iv) using the shared secret to derive a symmetric ciphering key, and (v) symmetrically encrypting at least the device identity portion of the SUPI 101a into a SUCI 101b.

With the technology supporting post-quantum cryptography and asymmetric ciphering, the different steps in FIGS. 1b and 2 below for the present disclosure can convert a SUPI 101a into a SUCI 101b using different steps. The different steps can (1) storing an identity a network static PQC public key, (2) combining the device identity with a variable, and (3) asymmetrically encrypting the device identity and the variable with the network static PQC public key. Note the fewer steps required for the present invention to convert a SUPI 101a into a SUCI 101b, as well as the benefits of remaining secure when ECC algorithms can be broken by quantum computers. Additional details for the steps 1-3 will be described below, such as within FIG. 1b. Note that cryptographic algorithms 101s and PKI keys for device 101 can support post-quantum cryptography (PQC) and support code-based, lattice-based, and related cryptographic algorithms. Example possible algorithms for parameters in device certificate cert.device 101c include those described in "Post-Quantum Cryptography Standardization" from Wikipedia dated Mar. 12, 2019, which is herein incorporated by reference.

Although "user" is the term depicted in FIG. 1 and also for a NAI in RFC 7542 and related 3GPP specifications, the "user" portion of a NAI can comprise a string of digits or numbers or characters to uniquely identify device 101 for a network 103 and the "user" portion of a NAI within a SUPI 101a or SUCI 101b does not need to be associated with a user such as a person. In other words, a "user" within an identifier such as a NAI or a SUPI 101a can be an identity for a device. The plaintext for the realm in a SUCI 101b can be required in order for MNO 102 and/or network 103 to route data for a SUCI 101b forward (e.g. MNO 102→network 103). MNO 102 could use a first plaintext prefix with a network ID 103a in the realm to select a network 103. In other words, in exemplary embodiments, the realm portion of a NAI for a SUCI 101b can remain plaintext, although the "user" portion of a NAI for a SUCI 101b can be encrypted.

The "user" 101u portion of a NAI for a SUPI 101a could comprise a medium access control (MAC) address for a physical interface such as Ethernet or WiFi, an international mobile subscriber identity (IMSI) or international mobile equipment identity (IMEI) with 2G/3G/4G networks, and other possibilities exist as well for the user portion of a NAI as a SUPI 101a without departing from the scope of the present invention. In exemplary embodiments, SUPI 101a can be written to hardware in device 101 and operate as a globally unique, long-term identity for device 101. Note that a device 101 could use several different SUPI 101a, such as a first SUPI 101a with a first network 103 and a second SUPI 101a with a second network 103, where the realm portion can be different for the first and second SUPI 101a and the different realm portions can include different network IDs 103a.

A device 101 can record and use at least one device secret key K.device 101d (e.g. "secret key"). The secret key K.device 101d can comprise a pseudo-random number used by both device 101 and network 103 (or MNO 102) in order to conduct authentication and key agreement, such as a 5G AKA or AKA' protocol. The secret key K.device 101d could be equivalent to the key K used with 4G networks and recorded in SIM cards, or the key Ki within 5G networks. The secret key K.device 101d could also be referred to as a shared secret key, since the secret key is shared between network 103 and device 101. The network 103 would normally store the key K or K.device 101d within a secure area of network 103, which could be part of the UDM function depicted for network 103 in FIG. 1a.

As depicted in FIG. 1a, the secret key K.device 101k can be associated with an identity ID.K.Device 101i, which could comprise a string or number to identify the secret key K.device 101k for device 101. In other words, a device with an identity of a SUPI 101a may use a plurality of secret keys K.device 101k over time (such as using different key lengths or supporting different protocols such as AKA or AKA'), and the selection or use of the specific secret key K.device 101k could be specified using an identity for the key of ID.K.device 101i. A table or list of values stored within a TRE 113 of device 101 could include a first list of secret keys K.device 101k and a second list of corresponding identities for the keys of ID.K.device 101i. A device could store a device database 101d as depicted in FIG. 1c to store the different values of shared secret keys K.device 101k and identities for the keys of ID.K.device 101i. Both network 103 and device 101 could refer to the specific secret key K.device 101k to use based on the identity for the key of ID.K.device 101i. In some exemplary embodiments, the identity for the key of ID.K.device 101i can comprise a secure hash value over the secret key K.device 101k, such as using the RIPEMD-160 secure has algorithm over the secret key K.device 101k. In exemplary embodiments, the length of the secret key K.device 101k can be either 128 or 256 bits, although other possibilities exist as well without departing from the scope of the present disclosure.

Device 101 can store or record a network static public key for the network of PK-ENC.Network 101e in order to conduct asymmetric encryption 101j of at least the user name portion (e.g. device name or identity) of the SUPI 101a, where the user name 101u portion for a SUPI 101a is described above. The network static public key can be associated with a set of cryptographic parameters ENC.Parameters 101f for using the network static public key 101e, and the cryptographic parameters could be used with asymmetric encryption 101j function. The asymmetric encryption 101j function can also be referred to as a public key encryption.

In an exemplary embodiment, the ENC parameters 101f could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. Other post-quantum cryptographic algorithms and parameters could be supported as well. The value of PK-ENC.Network 101e could be written to memory 101m during manufacturing or distribution or configuration of device 101, such as during a step 203a or step 203b in FIG. 2 below. Note that PK-ENC.Network 101e can comprise multiple different or separate public keys, such that different values of PK-ENC.Network 101e can be selected depending on the parameters ENC.Parameters 101f used by asymmetric encryption function 101j. In other words, PK-ENC.Network 101e can include a first public key for Kyber-768, a second public key for Kyber-1024, where the selection of the first public key or second public key could be based on ENC.Parameters 101f.

MNO parameters 101g can include a list of numbers or strings for values such as (i) allowed frequencies or frequency bands to scan, (ii) preferred access lists for roaming onto other wireless networks, (iii) criteria for a device 101 to select MNO 102, including in idle mode, (iv) support for emergency services, (v) supported languages or character encoding, (vi) codes to search for in beacons broadcast by a wireless network 102, (vii) parameters for a radio 101r to use when connecting to a wireless network 102, (viii) names or addresses for a server associated with a MNO 102 in order for a device 101 to conduct radio resource connect procedures, etc. A device 101 can record multiple sets of MNO parameters 101g for a plurality of different MNO 102, and a device 101 could select a MNO 102 from a plurality of available MNO 102 for radio 101r based on data within MNO parameters 101g.

Device 101 can include an encryption function 101j in order to convert a SUPI 101a into a SUCI 101b. The encryption function 101j for device 101 and corresponding decryption function 103j for network 103 are also depicted and described in connection with FIG. 1b below. Although the encryption function 101j is described above as an asymmetric encryption function 101j, in some embodiments the function 101j for the device 101 and the corresponding function 103j for the network 103 can comprise a key exchange mechanism (KEM), such as depicted and described in connection with FIGS. 4 and 5 below.

Cryptographic algorithms 101s can include the steps and logic for processor 101p in device 101 to conduct in order for device 101 to securely communicate with MNO 102 and network 103. Cryptographic algorithms 101s can include at least symmetric ciphering algorithms, a random number generator, a key pair generation algorithm, digital signature algorithms, asymmetric ciphering algorithms, and key exchange algorithms. Cryptographic algorithms 101s can use libraries available from example cryptographic suites such as OpenSSL, crypto++, BouncyCastle, or Mozilla, and other possibilities exist as well without departing from the scope of the present disclosure. Cryptographic algorithms 101s can use inputs of keys such as public keys, private keys, and/or symmetric keys along with cryptographic parameters 101x in order to for device 101 to process cryptographic data including ciphertext, key exchanges, and digital signatures.

Cryptographic parameters 101x can specify values or settings for (i) processing a SUPI 101a into a SUCI 101b that supports post-quantum cryptographic algorithms, (ii) mutually deriving a shared secret, (iii) mutually deriving a symmetric ciphering key from the shared secret, (iv) using a symmetric ciphering algorithm with the symmetric ciphering key, and (v) using a digital signature algorithm. As contemplated herein, cryptographic parameters 101x may also be referred to as parameters 101x. Each of device 101, MNO 102, and network 103 and device provider 104 can record at least one compatible subset of parameters within a set of cryptographic parameters 101x. Parameters 101x can specify values for key length, key formatting (e.g. compressed or uncompressed), encoding rules, constants, numbers or variables for a post-quantum cryptography algorithm, etc.

Network 103 can comprise a collection of servers and also operate as a cloud service. As depicted for system 100 in FIG. 1a, network 103 can communicate with device 101 and MNO 102 through IP network 107. Network 103 can include a network identity of network ID 103a, which could comprise a domain name, a name, or a string to uniquely identify network 103 in a system 100. In exemplary embodiments, at least a portion of network ID 103a is included in the realm of device identity comprising a NAI for SUPI 101a. Network 103 can include at least one server 111 as depicted in FIG. 1a. Server 111 can include hardware components similar to those of a device 101 depicted in FIG. 1a, except generally with larger capacities appropriate for a server 111. Server 111 can also operate as a host computing environment with physical hardware for a virtual machine to operate as a guest computing environment. In an exemplary embodiment, the AUSF 103b can comprise a virtual machine operating on server 111.

A server 111 can include random access memory (RAM) 111a, storage memory 111b, at least one system bus 111c, and at least one network interface 111d. As within a server 111 operating in a network 103, server 111 can include at least one processor 103p in order to store and record data as well as communicate with other nodes over an IP network 107, such as with MNO 102 and device provider 104 through an IP network 107. Processor 103p can also be referred to as a central processing unit (CPU) 103p. Processor 103p can comprise a general purpose processor appropriate for the computational requirements for a server 101, and may operate with multiple different processor cores, including field programmable gate arrays (FPGA).

A processor 103p can comprise exemplary ARM® based processors or an Intel® based processor such as belonging to the XEON® family of processors, and other possibilities exist as well. Processor 103p can utilize the system bus 111c to fetch instructions from RAM memory 111a or storage memory 111b within a server 111 and operate on the instruction. A processor 103p can include components such as registers, accumulators, and logic elements to add, subtract, multiply, and divide numerical values and record the results in memory. In exemplary embodiments, at least one processor 103p within server 111 can be used to conduct the steps and message flows depicted in FIG. 2 below.

RAM 111a may comprise a random access memory for Server 111. RAM 111a can be a volatile memory providing rapid read/write memory access to processor 103p. RAM 111a could be located on a separate integrated circuit in server 111. The system bus 111c may be any of several types of bus structures including a memory bus or memory controller, a peripheral bus, and a local bus using any of a variety of bus architectures including a data bus. System bus 111c connects components within server 111, such as transferring electrical signals between the components illustrated for a server 111. Server 111 can include multiple different versions of bus 111c to connect different components, including a first system bus 111c between CPU 103p and RANI 111a (which could be a memory bus), and a second system bus 111c between CPU 103p and network interface 111d, which could be a SPI bus, a PCI bus, or similar data busses.

Server 111 may also operate a network interface 111d, where network interface 111d can be used to connect and communicate with other nodes such as depicted in FIG. 1 and also FIG. 2 below. Network interface 111d can comprise a physical interface connected to system bus 111c for server 111. In exemplary embodiments, network interface 111d can comprise an Ethernet or fiber optic wired connection. Network interface 111d can connect server 111 to plurality of computing devices and other servers through networks such as the globally routable public Internet.

Nonvolatile memory 111b or "storage" 111b (which can also be referred to herein as "storage memory 111b") within server 111 can comprise a non-volatile memory for long-term storage of data, including times when server 111 may be powered off. Storage memory 111b may be a NAND flash memory or a NOR flash memory and record firmware for server 111, such as a bootloader program and an operating system. Storage memory 111b can record long-term and non-volatile storage of data or files for server 111. In exemplary embodiments, the network identity 103a is recorded in storage memory 111b when server 111 is powered off, and the network identity 103a along with a network database 103d are moved by CPU 103p into RANI 111a when server 111 powers on.

Storage memory 111b can operate as a traditional hard disk drive or a solid state drive (SSD), or as a storage area network (SAN). Storage memory 111b can also comprise a plurality of spinning hard disk drives in a redundant array of independent disks (RAID) configuration. Storage memory 111b may also be referred to as "server storage" and can include exemplary file systems of FAT16, FAT 32, NTFS, ext3, ext4, UDF, or similar file systems. As contemplated herein, the terms "memory 111b", "storage memory 111b", and "nonvolatile memory 111b" can be considered equivalent.

Network 103 can include an authentication server function AUSF 103b as described in ETSI TS 133 501 V15.1.0, as well as subsequent or related versions of ETSI standards. In general, an authentication server function can communicate with a security anchor function SEAF 102b from MNO 102. AUSF 103b can receive a SUCI 101b for device 101 from SEAF 102b, where MNO 102 receives SUCI 101b from device 101 via a wireless network and radio 102r. Additional details for the communication and operation of AUSF 103b for network 103 is provided below in FIG. 2 and FIG. 5.

In exemplary embodiments, AUSF 103b and device 101 can support AKA authentication, where AKA authentication for device 101 using a wireless network is described in ETSI TS 133 501 V15.1.0. AUSF 103b can send and receive messages with device 101 through MNO 102 and also send and receive messages with device provider 104 through IP network 107. Network 103 can include at least one processor 103p, where processor 103p can operate in a similar manner as a processor 102p described above for MNO 102. Processor 103p could be included in a server 111 and also within AUSF 103b. A network 103 can operate with a plurality of processors 103p and/or servers 111 in order to perform the steps and communicate the messages depicted and described for a network 103 in FIG. 2 below.

As depicted in FIG. 1a, a network 103 can also operate a network database 103d. A network database 103d could comprise a collection of servers and storage memory for storing values associated with a plurality of devices 101 in order to support the operation of a system 100. The functions within 5G networks of a Unified Data Management (UDM), and Authentication credential Repository and Processing Function (ARPF) are depicted in FIG. 1a as operating within a network database 103d, but the UDM and/or ARPF could be outside or external to a network database 103d and the UDM and/or ARPF could contain a network database 103d. As described by 3GPP and ETSI standards, the Unified Data Management (UDM) uses the subscription data stored in UDR and implements the application logic to perform various functionalities such as authentication credential generation, user identification, service and session continuity etc. As described by 3GPP, Authentication credential Repository and Processing Function (ARPF) keeps the authentication credentials. Note that equivalent functionality could be stored in networks supporting protocols and standards other than 5G, such as a database 103d storing the key K.device 101k (for a plurality of devices) in a secure manner.

A network database 103d could store values, strings, or numbers for device 101 such as a SUCI 101b received from MNO 102 and a shared secret key K.device 101k for device 101, and other data could be stored in a network database 103d as well. Data within a network database 103d could be recorded or stored as network 103 receives data for a device 101 from a MNO 102 and a device provider. Subsequent communications after receipt of the data from the previous sentence could use a network database 103d in order to select stored values for communication with device 101. A network database 101d is also depicted and described in additional detail below in FIG. 1c.

Network 103 can store a plurality of device identities comprising SUPI 101a for a plurality of devices 101. The values of SUPI 101a could be recorded within network database 103d along with the unique user name 101u portion for each of the devices 101. Note that for a given device 101 in a system 100, a user name 101u may not be globally unique, but the combination of user name and realm for a SUPI 101a can be globally unique in preferred embodiments. Network 103 can also store the concealed identity SUCI 101b received from a MNO 102 and originated by device 101 in order to conduct an asymmetric decryption step 103j to convert the SUCI 101b into a SUPI 101a for a device 101. The function and operation of an asymmetric decryption step 103j is depicted and described in connection with FIG. 1b below.

Network 103 can store or record at least one private key of SK-ENC.Network 103b in order to conduct an asymmetric decryption step 103j of the ciphertext generated by the device asymmetric encryption step 101j, which is described above. The ciphertext could comprise at least the user name 101u in a received SUCI 101b. The plaintext within ciphertext for the user name 101u can also include a separate number or random number as depicted and described in connection with FIG. 1b below. The private key can be associated with a set of cryptographic parameters ENC Parameters 101f for using the private key (such as specified Lattice parameters), and the cryptographic parameters could be used with asymmetric decryption function 103j. Note that a network 103d could use (i) a first SK-ENC.network 103b with a first network ID 103a with asymmetric decryption step 103j and (ii) a second SK-ENC.network 103b with a second network ID 103a with the asymmetric decryption step 103j, which is also depicted within a network database 103d in FIG. 3 below.

Different devices 101 could include different network 103a names in the SUCI 101b, such as a first set of devices using an exemplary value of "company-1" in the realm portion of a SUCI 101b and a second set of devices using an exemplary value of "company-2" in the realm portion of SUCI 101b. In exemplary embodiments, the network ID 103a in the realm portion of a SUCI 101b can be used to select from network database 103d the SK-ENC.network 103b for an asymmetric decryption step 103j, such that different devices 101 can use different corresponding PK-ENC.network 101e for a SUPI/asymmetric encryption function 101j by the different devices. The use of network ID 103a names and different secret keys SK-ENC.network 103b for network 103 is also depicted for a network database 103d in FIG. 1c below.

ENC Parameters 101f can specify public key encryption and private key decryption parameters associated with private key SK-ENC.network 103b. As described above, the device 101 can record a public key corresponding to SK-ENC.network 103b, where the public key for device 101 can comprise PK-ENC.network 101e as depicted in FIG. 1a. The value of PK-ENC.network 101e could be generated by network 103 using SK-ENC.network 103b and ENC Parameters 101f. PK-ENC.network 101e could provided to device 101 before device 101 sends a SUCI 101b to MNO 102, such as during device manufacturing or device distribution or device configuration.

The ENC parameters 101f as stored by network 103 and device 101 can specify multiple values and fields necessary for using asymmetric encryption function 101j (or KEM 101j'' in FIG. 4 below) and asymmetric decryption function 103j (or KEM 103j'' in FIG. 4 below). Exemplary values for the ENC parameters are depicted within a device 101 in FIG. 1a, but the network 103 could store the equivalent ENC parameters 101f as well. The ENC parameters 101f can include an identity for a network static public key PK-ENC.network 101e, where the identity for the network static public key can comprise a value of PK-ENC.Identity 101f-1. The device 101 can select the correct PK-ENC.network 101e using the value of PK-ENC.Identity 101f-1. For some embodiments, the PK-ENC.Identity 101f-1 can comprise a secure hash value of PK-ENC.network 101e. Network 103 can select which secret key SP-ENC.network 103b to use based a PK-ENC.Identity 101f-1 either sent to or received from a device 101.

PK-ENC.Length 101f-2 can specify a length in bits for using PK-ENC.network 101e in order to encrypt a ciphertext (e.g. the size in bits of data that could be encrypted using PK-ENC.network 101e). Device 101 could store a plurality of PK-ENC.network 101e supporting different bit lengths, and select a specific PK-ENC.network 101e to use based on PK-ENC.Length 101f-2. Or the PK-ENC.Length 101f-2 can be used to select the size of a random number or pad to include in a plaintext "data for encryption" 121 in FIG. 1b below. ENC.Algorithm 101f-3 can specify which PCQ algorithm to use for functions 101j and 103j, such as Kyber, a multivariate KEM, or a Supersingular Elliptic Curve Isogeny KEM. ENC.Algorithm 101f-3 could also specify constants, values, or settings associated with the cryptographic algorithm.

Different values of SK-ENC.network 103b and corresponding ENC Parameters 101f can be selected by network 103 using (i) at least a portion of network ID 103a in a realm within a received SUCI 101b for device 101 and (ii) a network database 103d. SK-ENC.network 103b can comprise a first private key for an exemplary lattice-based algorithm of Kyber768. The associated ENC parameters 101f for the first private key could be n=256 and q=7681. The parameters that define key and ciphertext could be set to du=11, dv=3 and dt=11. For Kyber768, the values of k could be 3 and n could be 4. Other values for ENC parameters 101f are possible as well without departing from the scope of the present disclosure. SK-ENC.network 103b can also comprise a second private key for an exemplary lattice-based algorithm of Kyber1024. The associated ENC parameters 101f could be the same as above, except for the use of k=4 and n=5. Both PKI keys and parameters could support other PQC algorithms besides the Kyber family of algorithms.

The PKI keys and parameters could support any of the PKI algorithms from Round 2 of the MST PQC standardization project where the algorithms support public key encryption with a public key for a network 103 stored on a device and then the private key stored in a network 103 to decrypt ciphertext generated by the device using the public key. Note that the transmission of a SUCI 101b by device 101 can also include a specified set of ENC parameters 101f in order to identify parameters or values associated with the ciphertext transmitted by device 101 along with the SUCI 101b.

Network 103 can include an asymmetric decryption step 103j in order to convert a SUCI 101b into a SUPI 101a. The decryption function step 103j can comprise the identity decryption scheme as depicted and described in connection with FIG. 1b below. In summary, network 103 can receive the SUCI 101b with a ciphertext that was encrypted by the device using the PK.ENC.network 101e. In exemplary embodiments, the ciphertext includes at least a device identity or user name 101u as plaintext that was encrypted into the ciphertext. The SUCI 101b could include ENC parameters 101f to identify cryptographic parameters and keys for network 103 to decrypt the ciphertext back into the plaintext with at least the device identity or user name.

Cryptographic algorithms 103s can include symmetric ciphering algorithms, a random number generator, a key pair generation algorithm, digital signature algorithms, asymmetric ciphering algorithms, and key exchange algorithms. Cryptographic algorithms can also include a key verification step for verifying that a received public key is valid for selected parameters such as cryptographic parameters 101x and ENC parameters 101f. Cryptographic algorithms 103s can use libraries available from example cryptographic suites such as OpenSSL, crypto++, BouncyCastle, or Mozilla, and other possibilities exist as well without departing from the scope of the present disclosure. Cryptographic algorithms 103s can use inputs of keys such as public keys, private keys, and/or symmetric keys along with cryptographic parameters 103x in order to for network 103 to process cryptographic data including ciphertext, key exchanges, key derivation functions with keys, and digital signatures.

Cryptographic parameters 103x can specify values or settings for cryptographic algorithms 103s. For cryptographic algorithms 103s that use ECC, then cryptographic parameters 103x could specify curve names including a base point G and constants for an elliptic curve. An example of cryptographic parameters could include "Table 1: Parameters proposed to MST for instantiating Kyber KEM" in the PQ-Crystals submission to the MST PQC project. Cryptographic algorithms 103s for network 103 can correspond or be equivalent to cryptographic algorithms 101s for device 101. Note that a server 111 for a network 103 or device provider 104 can store and operate with cryptographic parameters equivalent to the depicted cryptographic parameters 103x.

Network 103 can operate a plurality of servers with at least one processor 103p. A processor 103p can comprise a central processing unit (CPU) or a "system on a chip" and be similar to a processor 102p for a MNO 102 described above. Network database 103d can record a plurality of values for a plurality of devices 101 in order for network 103 to manage or operate communications with device 101 through a network 103.

Device provider 104 can comprise an entity or set of servers for managing plurality of devices 101. Both device provider 104 and MNO 102 could operate a plurality of servers 111. Although depicted in FIG. 1a as "device provider 104", an entity such as a device owner, a device manufacturer, or a device distributor could record the data and perform the functions of a "device provider 104". In general, a device provider 104 can comprise an entity or collection of servers which is the source for providing configuration data to device 101 before device 101 connects with MNO 102. The configuration data could comprise the exemplary data within memory 101m for device 101 as depicted in FIG. 1a. As contemplated herein, a "device provider" may also be referred to as a "provider".

Although depicted as "device provider" in FIG. 1a, the device provider 104 could be a device owner, a device distributor, or a device manufacturer. In general, a device provider has a sufficient level of ownership or control of device 101 before device 101 connects with MNO 102 such that device provider 104 could record or store the device identity SUPI 101a, and potentially the key K.device 101k before device 101 connects with MNO 102. As one example, device provider 104 could be responsible for either (i) the insertion of a SIM card with the key K.device 101k stored in the SIM card or (ii) the download of an eUICC profile with the key K.device 101k.

Device provider 104 can include a provider identity of provider ID 104a. Provider ID 104a can comprise a name or unique identifier, including a domain name or at least a portion of a realm in a NAI, in order to uniquely identify device provider 104 in a system 100, since a system 100 could include a plurality of different device providers 104. At least a portion of the provider ID 104a can be included in the SUPI 101a and SUCI 101b, such as within the realm portion of the SUPI 101a and SUCI 101b, which is not depicted in FIG. 1a. In other words, although the realm portion of the SUPI 101a and SUCI 101b in FIG. 1a is depicted as "network 103a", the realm portion of the SUPI 101a could comprise "provider 104a.network 103a". Although a single provider ID 104a is depicted in FIG. 1a, a device provider could use a plurality of different related provider ID 104*a* names or identities, such as "company-1", "company-2", etc.

Although FIG. 1 depicts MNO 102, network 103, and device provider 104 as separate nodes or entities, in some exemplary embodiments different entities or function of the nodes could be combined. In one embodiment, a MNO 102 and a network 103 could be combined, such that a MNO 102 controls or operates the network 103. In this embodiment, then a MNO 102 would operate both a SEAF 102*b* and an AUSF 103*b*. Or, a network 103 could control or operate a MNO 102, such that the network 103 controls or operates both a SEAF 102*b* and an AUSF 103*b*. In addition, although a MNO 102 is depicted in FIG. 1*a*, the wireless networking technology operated by MNO 102 with radios 102*r* could use WiFi based technology (e.g. based on 802.11 standards) and a collection of geographically distributed WiFi access points. The WiFi access points could be controlled by network 103 and a security anchor function 102*b* could be omitted. In another embodiment, the function and operation of a network 103 and a device provider 104 could combined, such that either (i) network 103 records the data and operates the function of a device provider 104, or (ii) a device provider 104 operates an AUSF 103*b*. Other possibilities exist as well for the combination of the data and functions for a MNO 102, network 103, and device provider 104 without departing from the scope of the present invention.

FIG. 1*b*

Figure 1B:
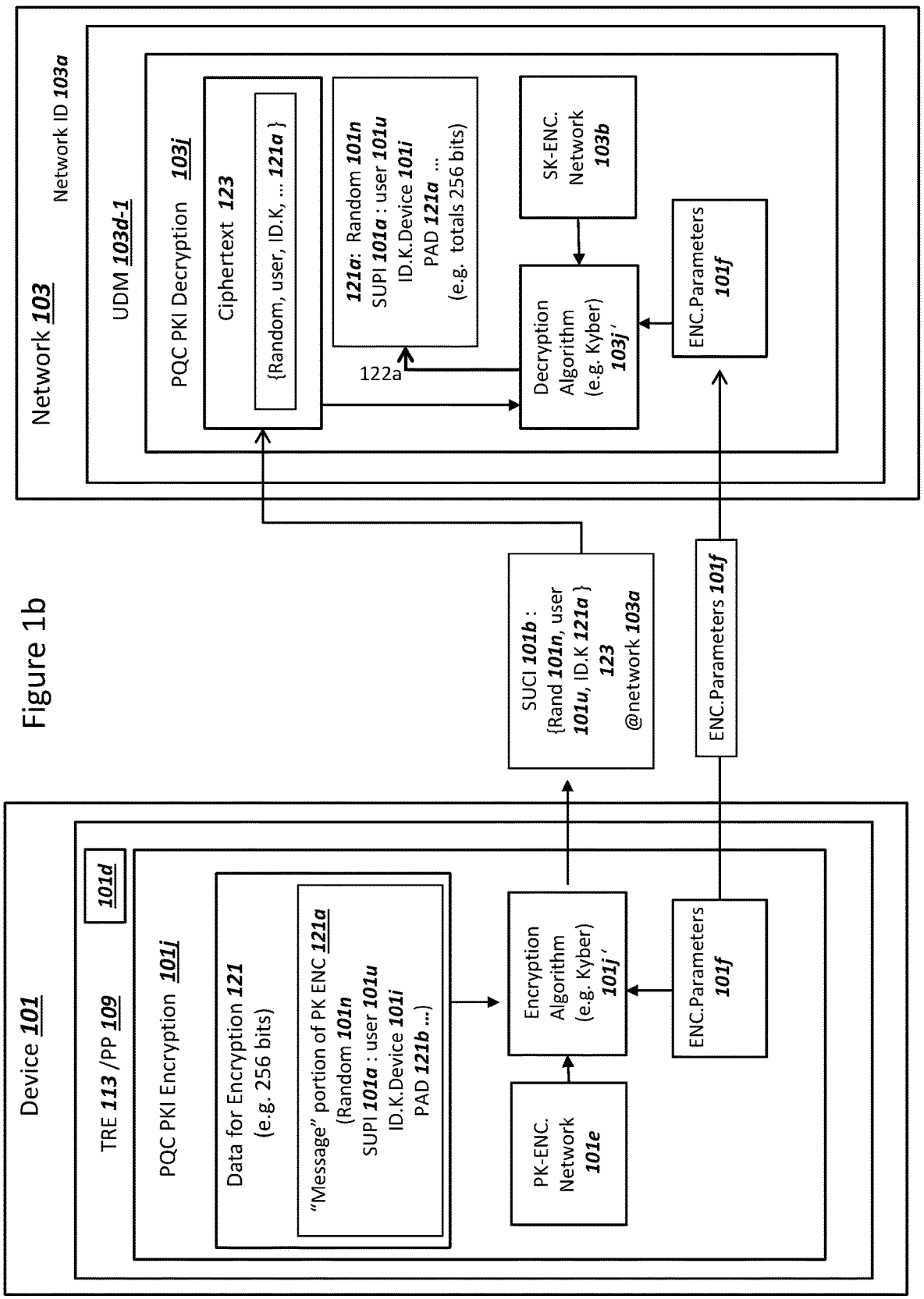
FIG. 1b is a flow chart illustrating exemplary steps using PKI keys, parameters, and data input for (i) a device to encrypt a ciphertext with the device identity and (ii) a network to decrypt the ciphertext, in accordance with exemplary embodiments.

FIG. 1*b* is a flow chart illustrating exemplary steps using PKI keys, parameters, and data input for (i) a device to encrypt a ciphertext with the device identity and (ii) a network to decrypt the ciphertext, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 1*b* depicts exemplary steps for a device to generate or encrypt a ciphertext 123 using public key encryption and for a network to process or decrypt the ciphertext 123 in order to read a plaintext value for a device identity or user name. Device 101 can include a tamper resistant element 113 with a primary platform 109, where the primary platform 109 generates the ciphertext 123 using an asymmetric ciphering algorithm 101*j*. In some exemplary embodiments, the use of a TRE 113 and PP 109 could be omitted, and the generation of a ciphertext 123 by device 101 could be performed or conducted within a processor 101*p*. The asymmetric encryption step or function 101*j* is also depicted as "PQC PKI Encryption 101*j*" in FIG. 1*b*. The step 101*j* could comprise public key encryption using a post-quantum cryptographic algorithm. Note that the public key encryption may not use the full key exchange mechanism specified by some PQC protocols, such as the agreement of a random shared secret of a value with 256 bits in a KEM as described below in FIG. 4, because the transmission of a value comprising at least the device identity or user name within the ciphertext 123 may be preferred. The following example within FIG. 1*b* will follow the steps for the Kyber algorithm within the PQ-Crystals project and proposal submitted to NIST, but other and different cryptographic algorithms could be utilized as well.

For a PQC PKI Encryption step 101*j*, device 101 can select and process data for encryption 121. The data for encryption 121 could comprise the message portion for the cryptographic algorithm. In some exemplary embodiments, the message can comprise a value of 256 bits. As depicted in FIG. 1*b*, data for encryption 121 could comprise a random number 101*n* generated by device 101, the user name portion of SUPI 101*a* (which could also be a device identity), an identity for the shared secret key K used by device 101 of ID.K.Device 101*i* (for subsequent AKA steps), and a pad value 121*b*. Additional data could be included in the data for encryption 121 as well, as depicted with the value of " . . . " in FIG. 1*b*.

In some exemplary embodiments, the realm portion of network identity 103*a* can be included in the data for encryption 121, as well as the plaintext realm portion of the SUCI 01*b*. In this manner upon a decryption step 103*j* by network 103, the plaintext network identity 103*a* from data for encryption 121 can be compared to the network identity 103*a* received in the realm portion of the SUCI 103*a* to verify that that the realm portion 103*a* has not been modified after transmission by device 101. Note the sequence and structure of data within data for encryption 121 could change, such that the depicted order for the individual elements is changed or altered, without departing from the scope of the present disclosure.

In exemplary embodiments, the total length of the data for encryption 121 depicted for (i) random number 101*n*, (ii) user name portion of SUPI 101*a*, (iii) ID.K.Device 101*i*, and (iii) pad value 121*b* can be an exemplary 256 bits when using the Kyber algorithms, since the message size is 256 bits. Other protocols could support message sizes of different lengths than 256 bits, which could be specified in PK-ENC.Length 101*f*-2 parameters. In exemplary embodiments the length of data for encryption 121 can be equal to a length specified by PK-ENC.Length 101*f*-2 parameters. The length of the pad value 121*b* can be adjusted so that the length of data for encryption 121 matches the message size specified by the protocol or the length specified in PK-ENC.length 101*f*-2. Or, in other embodiments, the length of random number 101*n* could be adjusted to have a length in bits such that the length of the data for encryption 121 (which includes at least the user name for SUPI 101*a*) matches the PK-ENC.Length 101*f*-2 parameters.

The random number 101*n* can be generated by device 101 each time a SUCI 101*b* is generated by device 101. The random number 101*n* could be a pseudo-random number generated by a processor 101*p*. The inclusion of a random number 101*n* within data for encryption 121 can ensure that the data for encryption 121 or "message" according to the PQC algorithm is unique for each SUCI 101*b*. In other words, without a random or changing value 101*n*, the data for encryption 121 could be constant and then the SUCI 101*b* could be constant and consequently a device 101 could be tracked within a wireless network since it could use the same SUCI 101*b* each time it initially attaches to MNO 102. In addition, although the value 101*n* is depicted as a "random number", the value 101*n* could comprise a number or series of bits that changes for each SUCI 101*b* generated by device 101. Thus, the value 101*n* does not need to be a "random number" and could comprise a number or series of bits that is a variable. The value 101*n* could comprise a sequence number.

In an exemplary embodiment, the PQC PKI encryption step 101*j* could follow the encryption steps specified by the Kyber algorithm. In the paper "CRYSTALS—Kyber: a CCA-secure module-lattice-based KEM" (referred to herein as Kyber paper), the message "m" can be the data for encryption 121 which is 256 bits in length for this embodiment. The step 101*j*' depicted in FIG. 1*b* can comprise the function/step of "Kyber.CPA.Enc" with the public key PK.ENC.network 101*e*. The parameters of ENC.parameters 101*j* could be a row from Table 1 of the Kyber paper such as Kyber768. The output of step 101*j*' and "Kyber.CPA.Enc" can be the value "c" in the Kyber paper or ciphertext 123 in FIG. 1*b*. The length of "c" and ciphertext 123 can be an exemplary 1152 bytes. Note that the function Kyber.Encaps may not be used in exemplary embodiments for asymmetric encryption of the device user name, since Kyber.Encaps would generate a hash value that could obfuscate the device user name. Thus, in exemplary embodiments, encryption step 101*j* and 101*j*' can use the public key encryption portion of a PQC algorithm and may not use the CCA-secure KEM portion of the PQC algorithm.

A PQC PKI encryption step 101*j* could append the ciphertext 123 to the plaintext realm portion of the SUCI 101*b*, such as the exemplary network identity 103*a* as the realm portion of a device NAI. The device could then transmit the complete SUCI 101*b* comprising the ciphertext 123 from a step 101*j* and the realm to network 103 via wireless network 102, which is also depicted and described in connection with FIG. 2 below. Note that in some exemplary embodiments where a wireless network 102 operates the network 103, then the network identity 103*a* in the realm portion of SUCI 101*b* could be omitted. For this embodiment, then the SUCI 101*b* could comprise only the ciphertext 123. In addition, although the use of a SUCI 101*b* is depicted in FIG. 1*b*, the format and structure of a SUCI according to ETSI standards is not required, and the ciphertext 123 and corresponding message sent from device 101 to network 103 could be a message different than the SUCI as defined by ETSI. In other words, the technology depicted in FIG. 1*b* can be used to encrypt and identity for a device 101 such as, but not limited to, at least a user name in a NAI or a device identity and send the ciphertext 123 to a network 103.

A network 103 with the network identity 103*a* could use a server 111 to receive the SUCI 101*b* from a wireless network 102. The network 103 could operate a Unified Data Management (UDM) 103*d*-1 to record PKI keys and process the received SUCI 101*b*. A UDM 103*d*-1 for network 103 was also depicted and described above in connection with FIG. 1*a*. The network 103 can operate or process a PQC PKI Decryption function 103*j* which can convert the ciphertext 123 portion of a SUCI 101*b* into plaintext. The ciphertext 123 can comprise encrypted data for the plaintext data 121*a*, which could comprise the message portion. The plaintext data 121*a* was described above for the data to sign 121 and can include (i) random number 101*n*, (ii) user name portion of SUPI 101*a*, (iii) ID.K.Device 101*d*-1, and (iii) pad value 121*b*. Additional data could be in plaintext data 121*a* as well, such as the realm portion of the SUCI 101*b* being in both the ciphertext 123 and as a plaintext realm for SUCI 101*b*.

The network 103 can input the ciphertext 123 into the decryption step 103*j*' in order to convert the ciphertext to plaintext. For embodiments that use the PC-Crystals algorithms and Kyber, then the decryption step 103*j*' can comprise the step "Kyber.CPA.Dec" from the Kyber paper. Decryption step 103*j*' can use the network static secret key SK.ENC.network 103b to recover the message (e.g. plaintext 121a of 256 bits for this example) with extremely high probability (with errors changes much less than one in a billion). In other words, although a successful decryption step 103j' can fail occasionally, the failure can be rare enough not to have a practical or meaningful affect.

After successful decryption of ciphertext 123, a decryption step 103j' can conduct a step 122a to process the plaintext 121a and read exemplary plaintext values of (i) random number 101n, (ii) user name portion of SUPI 101a, (iii) ID.K.Device 101i, and (iii) pad value 121b. The plaintext user name 101u portion of SUPI 101a can comprise a device identity such as an IMSI and other possibilities exist as well. The plaintext user name read from a step 103j can be used to select a device key K of K.device 101k and then a subsequent AKA protocol can be conducted between network 103 and device 101 using the selected K.device 101k. Note that the plaintext 121a from a SUCI 101b can include a value of ID.K.device 101i, which could specify a specific K.device 101k for use with device 101, and network 103 could select the specific K.device 101k using the ID.K.device 101i.

Note that for some exemplary embodiments, the inclusion of a user name 101u in a SUCI 101b could omitted, and simply the identity of the shared secret key ID.K.device 101i in a ciphertext 123 in FIG. 1b (or equivalently a ciphertext 403 in FIG. 4 below) can be sufficient for device 101 and network 103 to mutually agree on a shared secret key K.device 101k for conducting an AKA protocol. In other words, for some exemplary embodiments, an identity for device 101 (such as an IMSI or a user name 101u) within a SUCI 101b could be omitted, and the only requirement to establish subsequent secure communication between device 101 and a network 103 is agreement between the network 103 and the device 101 on a shared secret key K.device 101k. The agreement for the shared secret key K.device 101k could be established using the ID.K.device 101i as the core identifier for the device in a SUCI 101b. A separate identifier for the device, such as a user name 101u, could be securely transmitted from the device 101 to the network after or during the AKA protocol, such as after a message 219 depicted and described in connection with FIG. 2 and FIG. 5 below.

FIG. 1c

FIG. 1c is an illustration of a device database and a network database with exemplary data stored or recorded, in accordance with exemplary embodiments. A device 101 could store and operate a device database 101d as depicted and described in connection with FIG. 1a. Network 103 could store and operate a network database 103d as depicted and described in connection with FIG. 1. The device database 101d could be stored in a protected memory such as within a TRE/PP 109 as depicted and described in connection with FIG. 1b. A network database 103d could be recorded in a server 111 or collection of servers securely connected to network 103. A network database 103d could operate using software such as Oracle, Microsoft SQL Server, MySQL, and other possibilities exist for a database without departing from the scope of the present disclosure. A device database 101d could operate using flat files, tables stored in memory for TRE/PP 109, SQL lite, and other possibilities exist as well. Although the data depicted for a device database 101d and network database 103d is depicted as within a single table, the data stored could reside in multiple different tables, such as a first table in network database 103d storing the columns for SUCI 101b and SUPI 101a, and a second table in a network database 103d storing the columns for SUPI 101a, K.device 101k, ID.K.device 101i, etc.

Although both a device database 101d and network database 103d depict multiple values, strings, or numbers stored in each column and row, some values could be omitted at certain points in time, such as the data not being available at a point in time, although the omitted data could be provided or available later. For example, time 0 with a network database 103d could depict the values stored by a network database 103d before the network 103 receives data from a device 101 or a plurality of devices 101. Time 0 could represent the data stored by network database 103d upon configuration and setup of the database with configuration data for devices 101. At time 0, upon receipt of a message 205 below in FIG. 2 with a new SUCI 101b not previously stored in a network database 103d, network 103 could either update an existing row into a network database 103d with the SUCI 101b received in a message 205, or (ii) insert an entire new row into a network database 103d and query another database or process for additional data pertaining to device 101 that sent the SUCI 101b. Both device database 101d and network database 103d can be encrypted with a symmetric ciphering key such that the data is stored in physical memory such as storage 111b as ciphertext (for network database 103d).

Values depicted in FIG. 1c with different numeral designations such as "-1", "-2", "-3", etc. can represent different numbers or strings for the depicted value such as SUPI 101a. Values depicted in FIG. 1c with the same numeral designation such as the first four rows of SUPI 101a in a network database 103d being "101a-1", then "101a-1", then "101a-1", and then "101a-1" can represent that the number or string for SUPI 101a is the same for a first device in the first four rows. A column such as "device" can designate unique devices. Values depicted in FIG. 1c with different numeral designation such as the last three rows of SUPI 101a in a network database 103d being "101a-2", then "101a-3", then "104a-4" can represent that the number or string for SUPI 101a stored is different for each of the devices in the last three rows. Note the device column, which could be used as an index or value for tracking unique devices could also show that the devices in the last 3 rows are different.

Device database 101d can record data for device 101 in order to securely communicate with at least one network 103. Initial data recorded in a device database 101d can be stored during a configuration step 203b, and additional data could be inserted into the device database 101d over time. Device database 101d can include data or values for NAI User Name 101u, Network identity 103a, shared secret key K.Device 101k, the corresponding identity for the shared secret key of ID.K.Device 101i, MNO Parameters 102g, a Device Certificate 101c, a network static public key PK-ENC Network 103c, KEM or asymmetric encryption parameters ENC. Parameters 101f, and a Random number 101n. Additional data and fields could be stored within a device database as well.

The user name 101u can comprise a unique identifier for device 101 and may be associated with a network 103. The user name 101u could be an IMSI value, although could comprise another string or number selected by a device owner or device manufacturer or device provider instead of the network 103 or MNO 102. As depicted in FIG. 1c, a device 101 could store a plurality of different user names 101u for use with different MNO 102 or networks 103. Also note that a device 101 could use different user names 101u with the same network 103, such as the device 101 storing both a first user name 101*u*-3 and 101*u*-4 for a network 103*a*-4. A user name 101*u* was also depicted and described in connection with FIG. 1*a* above. The network identity or name of network ID 103*a* was also depicted and described in connection with FIG. 1*a* above.

A device 101 could store or record in a device database a plurality of different shared secret keys K.device 101*k* and associated identities for the shared secret key of ID.K.device 101*i*. The different shared secret keys K.device 101*k* could comprise different numbers and also be pseudo-random numbers. The different shared secret keys K.device 101*k* could use different key lengths such the depicted first shared secret key K.device 101*k*-1 comprising a key with length 128 bits and the depicted second shared secret key K.device 101*k*-2 comprising a key with length of 256 bits. Note that both the first and second shared secret keys K.device 101*k*-1 and 101*k*-2 are associated with the same network ID 103*a* and also user name 101*u*. As described above, the combination of network ID 103*a* and user name 101*u* can comprise a SUPI 101*a*. The selection or use of different keys K.device 101*k*-1 or 101*k*-2 could be specified in MNO parameters 102*g*' received by device 101 in a message 202 as depicted and described in connection with FIG. 2 below. Other possibilities exist as well for different keys K.device 101*k* stored within a device 101.

The identity of ID.K.device 101*i* can comprise a string or number uniquely associated with each shared secret key K.device 101*k*. In this manner and by using ID.K.device 101*i*, both device 101 and network 103 can refer to, identify, and communicate information about the K.device 101*k* by transmitting the ID.K.device 101*i*. For some exemplary embodiments, the ID.K.device 101*i* can comprise a secure hash over the K.device 101*k*, such as using the secure hash algorithm RIPEMD-160 over the K.device 101*k*. Or, the identity of ID.K.device 101*i* can comprise a sequence number or pseudo random number that is reasonably uniquely associated with or specifies the K.device 101*k*.

A device 101 could store or record in a device database a plurality of different MNO parameters 102*g*. The MNO parameters 102*g* were also depicted and described in connection with FIG. 1*a* above. MNO parameters 102*g* can include network codes broadcast by MNO 102 such as a mobile country code (MCC) or a mobile network code (MNC), frequencies for device 101 to utilize in connecting with MNO 102, settings for a radio 101*r* of device 101 to use when connecting with MNO 102, and other possibilities exist as well. A device 101 could store a plurality of different device certificates 101*c*, where the device certificate cert.device 101*c* was also depicted and described in connection with FIG. 1*a* above. Each of the different device certificates 101*c* could use different values for (i) a device identity such as a user name 101*u*, (ii) a device static public key, and/or (iii) a different certificate issuer for generating a digital signature for the device certificate 101*c*.

A device database 101*d* could also store a plurality of different network static public keys PK-ENC.network 101*e*. In exemplary embodiments, the different network static public keys PK-ENC.network 101*e* can be associated at least with a network identity 103*a*, such that a first network 103 with a first network identity 103*a* could use a first network static public key PK-ENC.network 101*e* and a second network 103 with a second network identity 103*a* could use a second network static public key PK-ENC.network 101*e*. Or, some networks could use more than a single network static public key PK-ENC.network 101*e*, such as a first network 103 with a first network identity 103*a* using both a first network static public key PK-ENC.network 101*e* with some devices and some geographic regions and then a second network static public key PK-ENC.network 101*e* with other devices or different geographic regions. The selection of the first or second network static public key 101*e* by the first network could be specified in the MNO parameters 102*g*' transmitted as a broadcast message from MNO 102 in a message 205, and other possibilities exist as well. In some exemplary embodiments, the MNO parameters 102*g*' can include the ENC parameters 101*f* for use by device 101, and thus device 101 could select a network static public key PK-ENC.network 101*e* based on the ENC parameters 101*f* receiving in a message 202.

A device database 101*d* could also store a plurality of different cryptographic parameters comprising encryption (ENC) parameters 101*f*. ENC parameters 101*f* can contain values specifying the use of cryptographic algorithms 101*s*, such as bit lengths for keys or output, encoding rules, padding schemes, constants or variable values for equations or math operations in order to conduct cryptographic operations, etc. ENC parameters 101*f* could be used for both asymmetric encryption such as step 101*j*' above in FIG. 1*b* and also a key exchange mechanism (KEM) in FIG. 4 below. Different network static public keys 101*e* could be associated with different ENC parameters 101*f*. Or, a plurality of different network static public keys 101*e* could be associated with the same ENC parameters 101*f*.

As depicted in FIG. 1*c*, a device database can also store at least one random number 101*n* for use in communication between device 101 and network 103. The random number 101 could be generated after as step 203*b* in FIG. 2 below. Different networks 103 or parameters 103*f* or user names 101*u* could be associated with different random numbers 101*n*. A random number 101*n* could be used to either (i) generate a key M 401 as depicted in FIG. 4 below, or (ii) used within a plaintext 121 for a ciphertext 123 as depicted in FIG. 1*b* above.

Several benefits or features of the present disclosure can be provided by the combinations of data stored in a device database 101*d* for device 101. Some exemplary benefits are depicted with boxes around certain rows and values, and will be described herein. The first box that includes row 1 and row 2 depicts the benefits described above for a device with the same user name 101*u* (which could be an IMSI) using two different shared secret keys K.device 101*k* with the same network 103 with network ID 103*a*. The selection or preference for the first shared secret key K.device 101*k*-1 or second shared secret key K.device 101*k*-2 could be specified based on MNO parameters 102*g*' transmitted in a broadcast message 202 in FIG. 2 and FIG. 5 below. Note that device 101 could both (i) use an identity for the selected shared secret key K.device 101*k*-1 or 101*k*-2 and comprising ID.K.device 101*i*-1 or 101*i*-2, and (ii) send the identity ID.K.device 101*i* back to MNO in a message 205 in FIG. 2 below or message 501 in FIG. 5 below. In this manner, network 103 can determine which of the first or second shared secret keys K.device 101*k*-1 or 101*k*-2 to use with a subsequent AKA authentication 223 as depicted and described in connection with FIG. 2 and FIG. 5 below.

In addition, for some embodiments, such as a device 101 and network 103 supporting both 128 bit and 256 bit keys for shared secret key K.device 101*k* (which could be (i) specified in MNO parameters 102*g*' transmitted by MNO 102 in a message 205 below in FIG. 2, or (ii) stored by device 101 in MNO parameters 102*g*) then a second shared secret key K.device 101*k*-2 could comprise a 256 bit key and the first shared secret key K.device 101*k*-1 could comprise a 128 bit key. The first shared secret key K.device 101*k*-1 could be a specified subset of the bits of the second shared secret key K.device 101k-2, such as, but not limited to, any of (i) the first 128 bits of the second shared secret key K.device 101k-2, or (ii) the last 128 bits of the second shared secret key K.device 101k-2, or (iii) a specific, selected subset of 128 bits of the 256 bits for the second shared secret key K.device 101k-2.

Further, a 256 bit length key for the second shared secret key of K.device 101k-2 could be derived from a first shared secret key K.device 101k-1, such as using a secure hash generating at least 256 bits such as, but not limited to SHA-256, SHA3-256, etc. from the first shared secret key K.device 101k-1. For example, during the transition of a MNO 102 and network 103 from the use of 128 bits for key length of shared secret key K.device 101k to 256 bits for key length of shared secret key K.device 101k, some shared secret keys K.device 101k already installed in devices 101 and deployed into use in the field may only have a shared secret key K.device 101k of 128 bits.

In order to support the transition from 128 bits to 256 bits for use of a shared secret key K.device 101k for AKA protocols, a network 103 could specify via MNO parameters 102g' that the device 101 use a second shared secret key K.device 101k-2 (such as the depicted K.device 101k-2 for network 103a-1 in device database 101d), where the second shared secret key K.device 101k-2 is generated by both device 101 and network 103 using a secure hash algorithm resulting in at least 256 bits over at least the first shared secret key K.device 101d-1. The secure hash algorithm could comprise a hash-based key derivation function (HKDF). The secure hash algorithm could also use or input a mutually agreed value between the device 101 and network 103 in addition to the first key K.device 101k-1, such as, but not limited to, the MCC or MNC or network ID 103a for the network 103 or MNO 102. The mutually agreed value between device 101 and network 103 could be transmitted by MNO 102 or specified or referred to by MNO 102 in a broadcast message 202 in MNO parameters 102g', where MNO parameters 102g' are depicted and described in connection with FIG. 2 and FIG. 5 below.

The second box in a device database 101d for device 101 includes row 2 and row 3. For the second box, the first user name 101u-1 can be used with both a second shared secret key K.device 101k-2 and a third secret key K.device 101k-3, where (i) the second shared secret key K.device 101k-2 can be used with a first network 103 and network identity 103a-1 and (ii) the third shared secret key K.device 101k-3 can be used with a second network 103 and network identity 103a-2. Note that if the first row is optionally omitted for some embodiments, then (i) the second shared secret key K.device 101k-2 for row 2 can be referred to as a first shared secret key, and third shared secret key K.device 101k-3 can be referred to as a second shared secret key.

This second box highlights advantages and differences of the present invention over conventional technology, where a single user name 101u-1 can be used by two different networks with network ID 103a-1 and 103a-2 in order to conduct an AKA authentication with the two networks using two different shared secret keys K.device 101k-2 and 101k-3. With conventional technology contemplated by 4G and 5G standards as of June 2020, a user name 101u-1 such as an IMSI is uniquely bound to a specific shared secret key K.device 101k, and a device using the same user name 101u-1 could not normally conduct an AKA authentication 223 (below in FIG. 2 and FIG. 5) with two different networks using the same IMSI and uniquely bound shared secret key K.device 101k since the two different networks of 103a-1 and 103a-2 would not both record or store the same shared secret key K.device 101k.

For this embodiment of the second box covering rows 2 and 3 of device database 101d, a device could select and use the different shared secret key K.device 101k-2 with the network 103a-2 based on the network ID 103a-2 being within MNO parameters 102g' broadcast in a message 202 below in FIG. 2. For this embodiment, then the use of a shared secret key identity of ID.K.device 101i associated with the shared secret key K.device 101k could be optionally omitted because both the network 103 and device 101 would know which shared secret key K.device 101k to use for AKA authentication 223 (in FIG. 2 and FIG. 5 below) based on the combination of user name 101u and network ID 103a. Thus, in some exemplary embodiments the use and transmission of a shared secret key identity of ID.K.device 101i can be omitted. But, for some embodiments such as the embodiment depicted by the first box for device 101 in device database 101d in FIG. 1c the transmission of shared secret key identity of ID.K.device 101i can be required.

Figure 5:
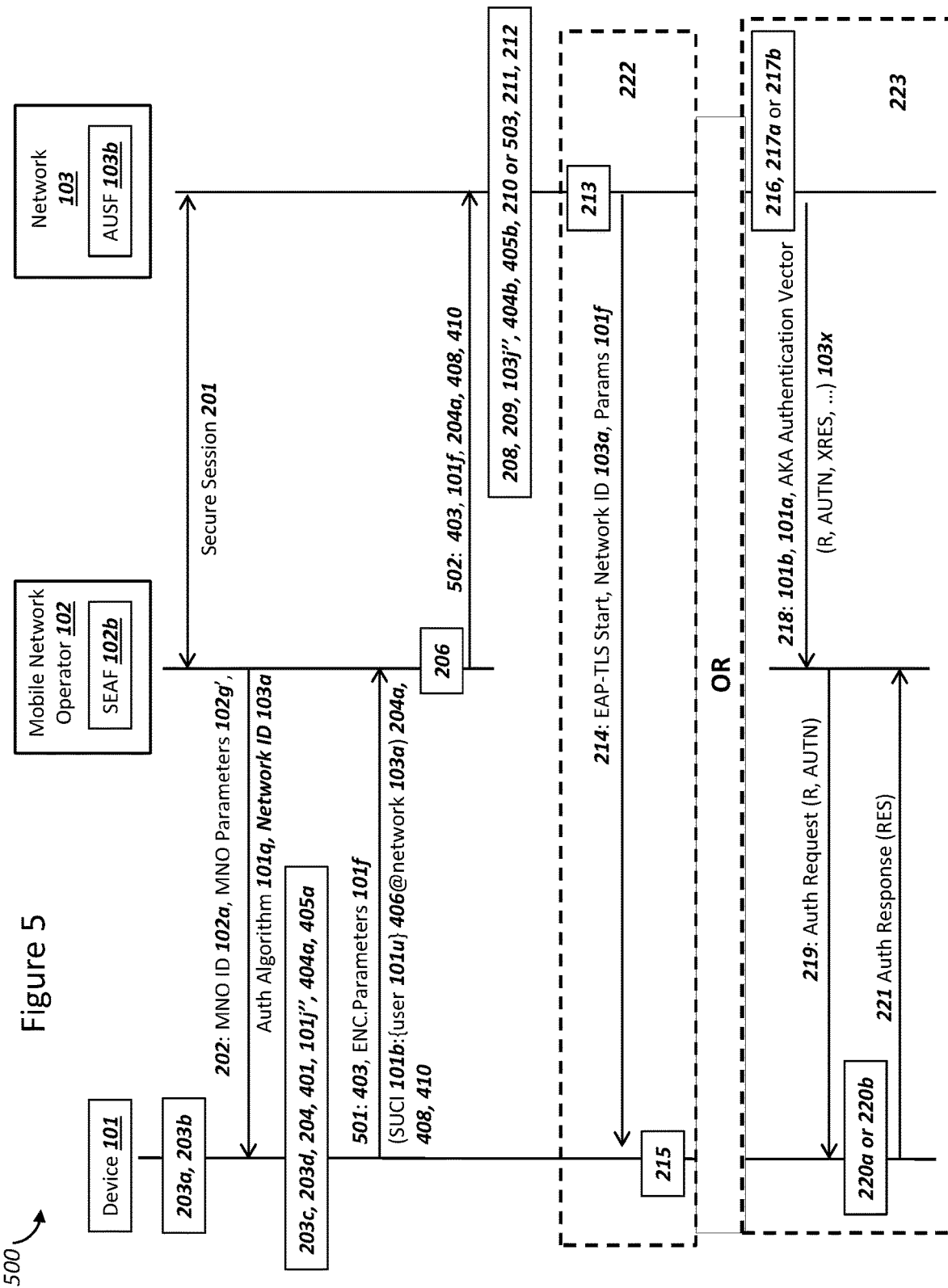
FIG. 5 is a simplified message flow diagram illustrating an exemplary system with exemplary data sent and received by a device, a mobile network operator, and a network, in accordance with exemplary embodiments.

Although not depicted with a separate box in FIG. 1c, another embodiment of the present invention supports the use of the same secret key K.device 101k with two different user names 101u. As described above, the user names 101u could comprise an IMSI value, although other names and identifiers for a device 101 could be used as well. For example, both the first row and the fourth row depicted a device using different user names 101u of 101u-1 and 101u-2. The first user name 101u-1 could be used with a first network 103 with network ID of 103a-1, and the second user name 101u-2 could be used with a second network 103 and network ID of 103a-2. Both the first and fourth row show device 101 can use the same shared secret key of K.device 101k-1 with (i) the first user name 101u-1 and the first network ID 103a-1 and (ii) the second user name 101u-2 and the second network ID 103a-2. With conventional technology and AKA authentication contemplated by 5G standards, a device 101 could not normally be able to use two different IMSI (e.g. 101u-1 and 101u-2) with the same shared secret key K.device 101k-1. Benefits of this depicted embodiment can be that a single shared secret key K.device 101k-1 from a single configuration step 203b (in FIG. 2 below) can support AKA authentication with two different networks using two different user names 101u or IMSI. Separate, secure steps could be conducted to ensure that a first network of 103a-1 and a second network of 103a-2 could shared the shared secret key K.device 101k-1 between the two networks in order for both networks to conduct an AKA authentication and protocol step 223 as depicted in FIG. 2 and FIG. 5 below.

In exemplary embodiments, a device 101 could record and use multiple different network static public keys PK-ENC.network 103e with the same network 103 with network identity 103a. As depicted in FIG. 1c, a device 101 could (i) use a first PK-ENC.network 103e-2 with a first network with network identity 103a-2 and (ii) use a second PK-ENC.network 103e-2 with the first network with network identity 103a-2, as depicted by row 4 and row 5 in FIG. 1c. The selection of the first or second PK-ENC.network 103e could be specified in MNO parameters 102g' received in a message 202 below in FIG. 2 and FIG. 5. Or a device 101 could select the first or second PK-ENC.network 103e and identify or specify the use of the first or second PK-ENC.network 103e in parameters 103f sent in a message 205 in FIG. 2 below or a message 501 in FIG. 5 below.

Network database 103d can record data for a plurality of devices 101 which could be managed or supported by a network 103. A network database 103d could store values, numbers, or strings for a time value (illustrated as a sequence in FIG. 1c, but could also comprise a time in UTC or unix epoch time), a device number, Device ID/SUCI 101b, Device ID/SUPI 101a, network static public key PK-ENC.Network 101e, a corresponding network static private key SK-ENC Network 103b, parameters for the network static public/private key of ENC Parameters 101f, a shared secret key for the device of K.Device 101k, an identity for the shared secret key for the device of ID.K.Device 101i, a Shared Secret M 401, where the generation and use of a share secret key M 401 is depicted and described in connection with FIG. 4 below, an authentication algorithm 101q, and authentication vectors 103x.

Device ID/SUCI 101b can in a network database 101d can comprise the SUCI 101b value received from a device 101 in (i) a message 205 and message 207 depicted and described in connection with FIG. 2 below or (ii) a message 501 and message 502 depicted and described in connection with FIG. 5 below. Before the messages mentioned in the previous sentence, a network database 101d would not normally have the SUCI 101b values to store, such as depicted at time 0.

Device ID/SUPI 101a can comprise the combination of the user name 101u and the network ID 103a for the device, as depicted and described in connection with FIG. 1a above. The Device ID/SUPI 101a value can be determined from the SUCI 101b by a network 103 and stored in a network database 103d after a step 103f' in FIG. 2 below or after a step 404b in FIG. 5 below. In exemplary embodiments, the SUPI 101a determined after receipt of a SUCI 101b can match a previously stored SUPI 101a, such as a SUPI 101a recorded at an initial time 0 before the device 101 sends the SUCI 101b.

Values for network static public keys PK-ENC.network 101e, the corresponding network static private key SK-ENC Network 103b, and parameters for the network static public/private key of ENC Parameters 101f could be stored at a time 0 before the device 101 sends the SUCI 101b. The PK-ENC.network 101e and ENC parameters 101f could be transmitted and stored by a device 101 during a configuration step such as a step 203b depicted and described in connection with FIG. 2 and FIG. 5 below. A network static public key PK-ENC.network 101e, the corresponding network static private key SK-ENC Network 103b, and parameters for the network static public/private key of ENC Parameters 101f were also depicted and described in connection with FIG. 1a above.

As depicted in FIG. 1c, a network 103 could use multiple different network static public keys PK-ENC.network 101e, such as both a first PK-ENC.network 101e-1 depicted in the first row and a second PK-ENC.network 101e-2 depicted in the second row. A device could also store the plurality of different network static public keys 101e-1 and 101e-2. The first and second network static public keys 101e-1 and 101e-2 could be associated with the same ENC parameters 101e-1. A network could specify the use of the first or second network static public keys 101e-1 or 101e-2 in a message 202 in the form of MNO parameters 102g' as depicted and described in connection with FIG. 2 below. Or, a device could select one of the two network static public keys 101e and transmit an identity or value specifying the selected network static public key 101e in a message 205 in FIG. 2 or message 501 in FIG. 5. Note that more than one device can store the same network static public key PK-ENC.network 101e, such device 1 in row 2 storing PK-ENC.network 101e-2 and device 2 in row 5 also storing PK-ENC.network 101e-2.

As depicted in FIG. 1c, a network 103 could use multiple different network static public keys with different parameters 101f for the different network static public keys, which is depicted in the first row and the fourth row. A first PK.ENC.network 101e, such as both a first PK.ENC.network 101e-1 depicted in the first row could be associated with a first set of parameters 101f-1. A second PK.ENC.network 101e-3 depicted in the fourth row could be associated with a second set of parameters 101f-2. A device could also store the plurality of different combinations, such as (i) network static public key 101e-1 with the first set of parameters 101f-1 and (ii) network static public key 101e-2 with the second set of parameters 101f-2. A network could specify the use of parameters 101f-1 or 101f-2 in a message 202 in the form of MNO parameters 102g' as depicted and described in connection with FIG. 2 below. A device could select the first or second network static public key 101e-1 or 101e-2 based on the received specification of parameters 101f-1 or 101f-2 in the message 202. Or, a device could select one of the two parameters 101f-1 or 101f-2 and transmit an identity or value specifying both (i) the selected parameters 101f and (ii) a network static public key 101e in a message 205 in FIG. 2 or message 501 in FIG. 5.

A network database 101d could store or record a plurality of different shared secret keys K.device 101k and associated identities for the shared secret key of ID.K.device 101i. The different shared secret keys K.device 101k could comprise different numbers and also be pseudo-random numbers. The different shared secret keys K.device 101k could use different key lengths such the depicted first shared secret key K.device 101k-1 comprising a key with length 128 bits and the depicted second shared secret key K.device 101k-2 comprising a key with length of 256 bits. Other possibilities exist as well, the first and second shared secret keys K.device 101k-1 and 101k-2 could be different values.

Note that both the first and second shared secret keys K.device 101k-1 and 101k-2 as depicted in FIG. 1c are associated with the same SUPI 101a-1 for a first device, as shown by the box in network database 103d covering both row 3 and row 4. This box covering both row 3 and row 4 highlights difference with conventional technology for 4G and 5G AKA authentication, since the same SUPI 101a would not normally be associated with two separate shared secrete keys K.device 101a. The selection or use of the first and second shared secret keys K.device 101k-1 and 101k-2 for the same SUPI 101a-1 could be specified through the use of the ID.K.device 101i. The device 101 could send the ID.K.device 101i in a message 205 in FIG. 2 below or a message 501 in FIG. 5 below. Or, as described in a step 210 below in FIG. 2, a network 103 could select the appropriate K.device 101k for a device 101 to use by (i) selecting the ID.K.device 101i, and (ii) sending a message to device 101 with the selected ID.K.device 101i. In this manner, network 103 and device 101 can mutually agree on the same shared secret key K.device 101k in order to conduct an AKA authentication and protocol 223 as depicted and described in connection with FIG. 2 and FIG. 5 below. For some embodiments, such as with the use of an EAP-TLS authentication and protocol 222 as depicted and described in connection with FIG. 2 and FIG. 5 below, the network 103 could omit storing a shared secret key K.device 101k and associated identity of ID.K.device 101i.

The authentication algorithm 101q could specify the use of an authentication algorithms such as the 5G authentication and key agreement algorithm specified in TS 133 501 v. 15, which is depicted as "AKA". The authentication algorithm 101q could specify the use of an authentication algorithms such as the EAP-AKA' authentication and key agreement algorithm (depicted in FIG. 1c as "AKA'"), which is specified in IETF RFC 5448. The authentication algorithm 101q could specify the use of EAP-TLS authentication, which is specified in IETF RFC 5216. An authentication algorithm 101q could also be referred to herein as an authentication scheme. Note that a blank for fields or data within network database 103d can indicate that no data for the value may be available at the time. In addition, the shared secret key K.device 101k can comprise a pre-shared secret key, while shared secret M 401 can comprise a key generated after network 103 receives a SUCI 101b from a device 101. In addition, the pre-shared secrete key K.device 101k can be securely shared between device 101 and network 103 "out of band" before the communications between device 101 and network 103 depicted in FIG. 2 and FIG. 5 below begin.

A network database 103d could also store a plurality of authentication vectors 103x for a plurality of devices 101. The authentication vectors 103x can be associated with a shared secret key K.device 101k or the corresponding ID.K.device 101i. The authentication vectors 103x could comprise a plurality of data in order to conduct an AKA authentication with device 101 using the K.device 101k, such as a random number, an expected response (XRES), a cipher key CK, and integrity key IK, a sequence number to track the authentication vector 103x used with the K.device 101k over time, as well as an authentication token (AUTN). The XRES can comprise a value generated using the random number and the shared secret key K.device 101k, such as a MAC code or digital signature over the random number with the shared secret key K.device 101k. The authentication token can comprise a digital signature or a MAC code for at least the random number using a network key, where the network key could also be stored by the device 101 in memory 101m or a device database 101d. In exemplary embodiments, data for the authentication vectors 103x can support the values and algorithms specified for conducting AKA in TS 133 501 v. 15. In exemplary embodiments, data for the authentication vectors 103x can support the values and algorithms specified for conducting an EAP-AKA' authentication and security protocol. Other possibilities exist as well for data within an authentication vector 103x for conducting an AKA without departing from the scope of the present disclosure.

Some data within a network database 103d could be recorded or stored before device 101 establishes an initial radio resource connection with MNO 102, such as during device manufacturing or distribution or a device configuration. Other possibilities exist as well for the time before a message 205 when data such as values for SUPI 101b and K.device 101k in a network database 103d can be recorded. As additional devices are added for a network 103, then additional rows for the additional devices could be inserted into a network database 103d. As depicted in FIG. 1c, a network database 103d could store additional data for a device 101 than the fields or values depicted. Additional data could include (i) a device certificate cert.device 101c, and (ii) a first list of cryptographic algorithms 101s and a second list of cryptographic parameters 101x for a device 101 with SUPI 101a in a device database 104d, where the first list and the second list could be used to determine an authentication method to use for device 101 (e.g. proceed with EAP-TLS authentication for device 101 after receipt of message 205 in FIG. 2 below or proceed with AKA authentication for device 101 after receipt of message 205). Other possibilities exist as well for data stored or recorded in a device database 104d without departing from the scope of the present disclosure.

Although a single network database 103d is depicted in FIG. 1c, a network database 103d could comprise either multiple databases or multiple tables with data equivalent or similar to that depicted in FIG. 1c. In one exemplary embodiment, a network 103 could operate multiple network databases 103d, where a first network database 103d is associated with a first network 103 and a second network database 103d is associated with a second network 103, etc. The realm values for a NAI within a SUCI or SUPI could include a first value for the network portion and/or provider portion of the realm for the first network and first network database. The realm values for a NAI within a SUCI or SUPI could include a second value for the network portion and/or provider portion of the realm for the second network and second network database.

The user name in a network database can comprise the user name 101u portion of a network access identifier (NAI) for a SUPI 101a. Or, the user name 101u for a SUPI 101a could comprise an IMSI value for a device 101. The SUPI 101a stored in a network database 103d can comprise the SUPI 101a as described above for a device 101 in FIG. 1a. Note that the user name 101u can be plaintext with a SUPI. In addition, a "user name" can comprise an identity for a device 101 and a "user name" does not need to be associated with a person. Although not depicted in FIG. 1c, a device certificate 101c stored in a network database 103d can comprise the device certificate 101c stored and used by device 101 as described for a device 101 in FIG. 1a. The format and data structure of device certificate 101c in a network database 103d and device 101 could take many forms such as a *.pem structure, raw text, *.crt, or *.der. *.crt can comprise a certificate format and *.der can comprise distinguished encoding rules for the certificate. Other certificates described herein, including device provider certificate 104c could be stored or transmitted in any of the exemplary formats described in the previous sentence. Although not depicted in FIG. 1c, a network ID 103a could be stored in a network database 103d and comprise the network identity used in the realm portion of a SUCI 101b and SUPI 101a for a device 101.

FIG. 2

Figure 2:
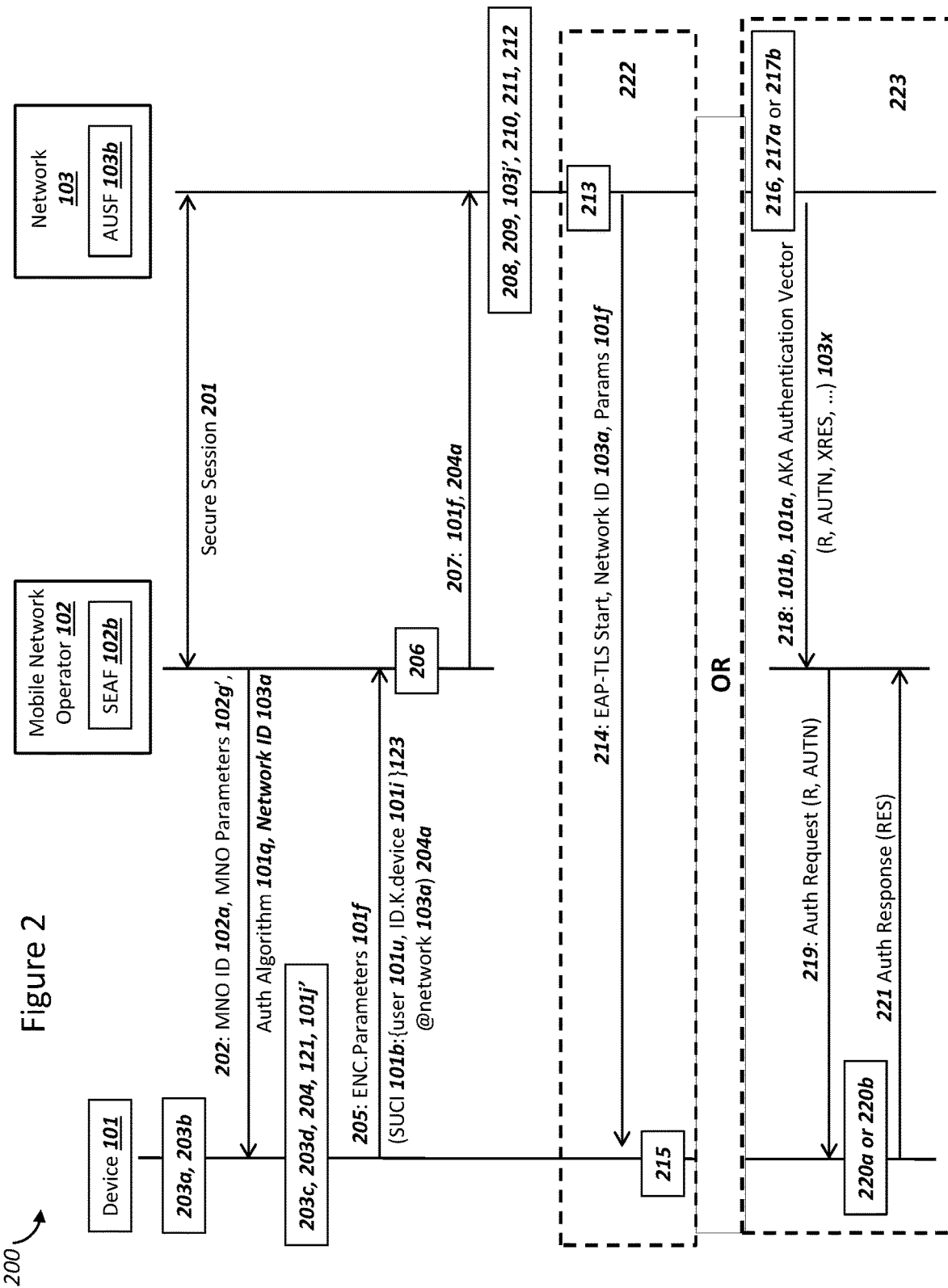
FIG. 2 is a simplified message flow diagram illustrating an exemplary system with exemplary data sent and received by a device, a mobile network operator, and a network, in accordance with exemplary embodiments.

FIG. 2 is a simplified message flow diagram illustrating an exemplary system with exemplary data sent and received by a device, a mobile network operator, and a network, in accordance with exemplary embodiments. System 200 can include a device 101, a mobile network operator (MNO) 102, and a network 103. The nodes or entities within system 200 were also depicted and described in connection with FIG. 1a above, where FIG. 2 depicts exemplary steps for the nodes and exemplary message flows between the nodes. Although a single device 101, MNO 102, and network 103 are depicted in a system 200, a system 200 could include a plurality of each of the depicted nodes connected via an IP network 107. In addition, data recorded for device 101 and network 103 depicted and described above in FIG. 1a can be recorded in the device 101 and network 103 depicted in FIG. 2 before the steps and message flows are conducted in FIG. 2.

In order to support authentication of devices 101 with network 103, a MNO 102 could establish a secure session 201 with network 103. Secure session 201 could comprise establishing a secure communications link between the two servers using protocols such as TLS, IPSec, a virtual private network (VPN), a secure shell (SSH), or similar networking, transport, or application layer technologies in order to establish secure communications between MNO 102 and network 103. Secure session 201 can utilize certificates for each of MNO 102 and network 103 in order to provide mutual authentication and mutual key derivation for a symmetric encryption key in secure session 201. Secure session 201 can also be conducted over IP network 107, although the secure session 201 could also be established or conducted through a private network. Other possibilities exist as well for establishing a secure session 201 between MNO 102 and network 103 without departing from the scope of the present disclosure.

At step 203a, device 101 can be manufactured, configured, and distributed to an end user. The configuration step 203a can include securely storing data for a device database 101d, where the exemplary data is depicted and described above in connection with FIG. 1a and FIG. 1c. Some data in a device database 101d depicted in FIG. 1c could be omitted in a step 203a, such as omitting the random number 101n in a device database 101d, and the random number 101n could be generated at a later time or step.

At step 203b, device 101 can power on and load firmware and configuration data in order to connect with wireless network 102. A step 203b can also include firmware or software in device 101 loading a RF module or radio 101r within device with an operating configuration such as MNO parameters 102g in FIG. 1a and FIG. 1c (such as frequencies to use, wireless technology to use such as 5G or WiFi 6, etc.). Step 203b can include device 101 scanning for available mobile networks 102 and then selecting a preferred mobile network. In exemplary embodiments, device 101 scans for mobile network identities broadcast in system information blocks, there the mobile network identity such as mobile network ID 102a matches the value for a mobile network in a realm for a SUPI 101a recorded by device 101.

Device 101 can receive an MNO identity of MNO ID 102a and MNO parameters 102g' in a message 202. Message 202 could comprise system information blocks (SIB) or equivalent data broadcast in a broadcast control channel or beacon channel or signal from MNO 102 using radio 102r. In other words, the MNO ID 102a and MNO parameters 102g' could be acquired by device 101 without device 101 transmitting data to MNO 102 after the power up step 203b above. MNO parameters 102g' could comprise a subset of MNO parameters 102g stored by device 101 in a device database 101d. MNO parameters 102g' could include a set of ENC parameters 101f, such that device 101 could use the ENC parameters 101f in order to generate a SUCI 101b and associated ciphertext, including ciphertext 408 as depicted and described in connection with FIG. 4 and FIG. 5 below.

Message 202 can also include supported authentication algorithms 101q, which could consist of a plurality of algorithms 101q such as those depicted and described in connection with FIG. 1c. Or, for some embodiments a value for authentication algorithm 101q in a message 202 could specify a single and selected authentication algorithm 101q supported by MNO 102 and network 103. In some exemplary embodiments, an authentication algorithm 101q in a message 202 can comprise data specifying support for at least (i) 5G AKA authentication and encryption, and (ii) EAP-TLS authentication and encryption by MNO 102 and network 103. The selection for use of either (i) 5G AKA authentication or (ii) EAP-TLS authentication can be conducted by either device 101 or network 103, such as by a network 103 in a subsequent step 212 below.

In an exemplary embodiment, the MNO parameters in a broadcast radio message 202 could comprise the exemplary values of MNO parameters 102g-2 stored by device 101 in a device database 101d. In an exemplary embodiment MNO parameters 102g-1 could specify the use of a 128 bit key length for shared secret K.device 101k and MNO parameters 102g-2 could specify the use of a 256 bit key length for shared secret K.device 101k, and other possibilities exist as well. Further, MNO parameters 102g' could specify a value for either PK-ENC.Network 101e or ENC.Parameters 101f. In an exemplary embodiment, MNO parameters 102g' can specify values of Kyber-512, Kyber-768, or Kyber-1024 for a key exchange mechanism or asymmetric encryptions. In other words, the MNO parameters 102g' broadcast by MNO 102 could specify the ENC parameters 101f for use with an asymmetric encryption algorithm 101j for use by a device 101 to generate a SUCI 101b. Device 101 could use the parameters 102g' broadcast by MNO 102 in order to select the ENC parameters 101f for use with an asymmetric encryption algorithm 101j.

At step 203c, device 101 can select a SUPI 101a from a device database 101d to use with MNO 102 based on at least MNO ID 102a or network ID 103a received in a message 202. At step 203c, device 101 can select a SUPI 101a to use based on the combination of MNO ID 102a and MNO parameters 102g' received in a message 202. In other words, device 101 could include multiple SUPI 101a with (i) different user names 101u and (ii) realms for different networks 103, and search for a MNO 102 with an identity 102a or 103a in an RF beacon or signal 202 that matches a realm for one of the multiple SUPI 101a. At step 203c, device 101 can select a SUPI 101a that supports or matches MNO ID 102a.

For other embodiments, the MNO ID 102a may not be included in a portion of a realm within a SUPI 101a in device database 101d, and a device 101 could select the MNO 102 using MNO parameters 102g'. At the conclusion of a step 203c, device 101 can select and store a SUPI 101a to use with a MNO 102. A step 203c can also include device 101 selecting MNO parameters 102g based on either (i) an observed and available MNO 102 for a radio 101r in device 101, or (ii) MNO parameters 102g' received in a message 202. MNO parameters 102g' can be a subset of MNO parameters 102g stored within device 101 during a configuration step 203a, and device 101 can select the subset of parameters 102g (such as and exemplary set 102g-2 depicted in FIG. 1c) using the received MNO parameters 102g' from a message 202. The selection of a SUPI 101a for device 101 in a step 203c can include the selection of a selection of network identity network ID 103a for a realm of SUPI 101a. The values for PK-ENC.network 101e and ENC Parameters 101f can be selected in a step 203c based on either (i) the network ID 103a for the SUPI 101a, or (ii) MNO parameters 102g' received in message 202.

As one example a SUPI 101a selected in a step 203c could comprise an exemplary value of "XXXXX@company.aws.com", where XXXXX is the user name 101u, "company" is the provider ID 104a and "aws.com" is the network ID 103a. As another example for a SUPI 101a selected in a step 203c, the SUPI 101a could comprise a value of YYYYYY@att.net, where "YYYYYY" could comprise an IMSI value and "att.net" is the network ID 103a. Other possibilities exist as well for a SUPI 101a selected by a device 101 in a step 203c without departing from the scope of the present invention.

At step 203d, device 101 can select a shared secret key K.device 101k for use with MNO 102 and/or identity for the shared secret key of ID.K.device 101i. The selection of a shared secret key K.device 101k and/or identity for the shared secret key of ID.K.device 101i can use data received in a message 202, such as, but not limited to, values for an authentication algorithm 101q within message 202. As one example, a first key K.device 101k could comprise a 128 bit long key and a second key K.device 101k could comprise a 256 bit long key. MNO parameters 102g' from a message 202 could specify a key length for shared secret keys of an exemplary 256 bits and device 101 could select the K.device 101k and ID.K.device 101i with 256 bits from a device database 101d. In addition, device 101 could select the K.device 101a and ID.K.device 101i using MNO ID 102a received in a broadcast message 202. In a step 203c, device 101 could use the supported authentication algorithm 101q from a message 202 in order to select a K.device 101a and ID.K.device 101i. In exemplary embodiments, device 101 in a step 203d can at least select an ID.K.device 101i from a device database 101d, where the ID.K.device 101i is associated with a K.device 101a. The selected ID.K.device 101i can be sent from device 101 to MNO 102 and network 103 in a subsequent message below. Or, for other embodiments a single K.device 101a can be associated with a MNO 102 and the use of an ID.K.device 101i could be omitted.

At step 204, device 101 can conduct a radio resource connection (RRC) request with MNO 102 using a radio 101r and the selected MNO parameters 101g. The RRC can transition a radio 101r in device 101 from an idle state to an active state. In the active state, device 101 can transmit messages or data to MNO 102. At step 121', device 101 could assemble the plaintext data for encryption 121, which was also described above in FIG. 1b. Prior steps 203c and 203d could be utilized to select the plaintext data for encryption 121 in a step 121'. In exemplary embodiments, the data for encryption 121 includes both (i) the plaintext device identity or user name 101u for device 101 and (ii) a variable that changes for each SUCI 101b generated by device 101 (which could be a random number 101n).

At step 101j device 101 can conduct the asymmetric encryption function 101j with network static public key PK.ENC.network 101e and data for encryption 121 in order to generate ciphertext 123 for a SUCI 101b as depicted and described in connection with FIG. 1b above. The user name 101u portion of a SUPI 101a can be input into the asymmetric encryption function 101j along with network static public key and parameters 101f in order to output a first portion the SUCI 101b comprising at least an encrypted user name 101u for the device 101. As depicted in FIG. 2, a value 204a can comprise the combination of (i) an encrypted user name 101u comprising a ciphertext 123 and (ii) the selected network ID 103a for a realm.

Device 101 can then send the selected MNO 102 through (i) a wireless network operated by MNO 102 and (ii) the radio resource connection from step 203 a message 205, where the message 205 includes the ENC parameters 101f and the value 204a. MNO 102 and SEAF 102b can receive the message 205 and conduct a step 206 in order to process the message 205. At step 206, SEAF 102b can (i) read the plaintext realm for SUCI 101b in value 204a, and (ii) select the network 103 using the network ID 103a in a realm for SUCI 101b. In a preferred exemplary embodiment as depicted in FIG. 2, the suffix of the realm can comprise the network ID 103a, but in a second embodiment, the prefix of the realm could comprise the network ID 103a. Or, in a third embodiment the realm portion of a SUCI 101b from a message 205 can be the network ID 103a.

Note that MNO 102 and network 103 could have prior commercial and technical agreements for MNO 102 to forward device 101 authentication data to network 103 and AUSF 103b. If MNO 102 has no commercial relationship with network 103, or secure session 201 could not be established, or MNO 102 cannot forward the data in message 205, then MNO 102 can send device 101 an error message with an error code explaining the failure. Device 101 could then take corrective steps, such as selecting a different MNO 102 or different network 103 via a different SUPI 101a for device 101 in order to send a message 205 to the different MNO 102.

MNO 102 can then send network 103 and AUSF 103b a message 207 through secure session 201, where (i) message 207 includes ENC parameters 101f and the value 204a, and (ii) the value 204a includes SUCI 101b. The AUSF 103b for network 103 can receive the message 207. At step 208, the AUSF 103b can read and process the plaintext data in the realm for SUCI 101b in value 204a. As depicted in FIG. 2, for some exemplary embodiments the realm for SUCI 101b in a value 204a can comprise the network ID 103a. A step 208 can include AUSF 103b storing SUCI 101b in a network database 103d for subsequent use in identifying device 101.

Network 103 can then conduct a series of steps in order to process the message 207. At step 209, network 103 can read the plaintext network ID 103a in SUCI 101b and use network database 103d in order to select (i) secret key SK-ENC.network 103b and (ii) any associated parameters for ENC parameters 101f that may be needed for an asymmetric decryption function 103j. A network 103 can also read the received parameters 101f from a message 207 in a step 209. For some embodiments, a network identity 103a can be uniquely associated with secret key SK-ENC.network 103b and (ii) ENC Parameters 101f. Or, in some embodiments, the parameters 101f from messages 205 and 207 can include a value or identity for a PK-ENC.Network 101e stored by device 101, and in a step 209 network 103 can use a network database 103d as depicted in FIG. 1c to select the SK-ENC.network 103b for use in an asymmetric decryption function 103j.

Network 103 can then conduct a step 103j' using asymmetric decryption function 103j in order to convert the ciphertext 123 portion of SUCI 101b into plaintext. Asymmetric decryption function 103j was depicted and described in connection with FIG. 1b above. In other words, a decrypted plaintext from ciphertext 123 can include a device user name 101u. Network 103 can securely store a SUPI 101a for device 101 after step 103j' by reading the plaintext data for encryption 121 as depicted in FIG. 1b above. Network 103 can also read the full plaintext data 121 after a decryption step 123, where the plaintext data 121 was depicted and described in connection with FIG. 1b above. The plaintext data can include a random number 101n, an identity for a shared secret key ID.K.device 101i, as well as a pad value 121b. Network 103 could store the random number 101n in a network database 103d for a device 101 and ensure that random number 101n is not reused in order to prevent replay attacks.

Network 103 can conduct a step 210 with the plaintext user name 101u and ID.K.device 101i to query a network database 103d for data pertaining to device 101. Network 103 can use the value of ID.K.device 101i received in ciphertext 123 with a SUCI 101b to select the shared secret K.device 101k for a subsequent AKA procedure. For some embodiments, the inclusion of an ID.K.device 101i within a message 205 and 207 could be omitted, such as if device 101 and network 103 use and specify a single shared secret key K.device 101*k* for a user name 101*u*, and in this case a step 210 could be omitted.

Or, for other exemplary embodiments, the inclusion of an ID.K.device 101*i* within a message 205 and 207 could be omitted, but (i) both network 103 and device 101 could use multiple different shared secret keys K.device 101*k* for the same user name 101*u* (such as depicted and described for the first box in device database 101*d* in FIG. 1*c* above). For these embodiments and a step 210 (where ID.K.device 101*i* was omitted from a message 205 and 207), then for a step 210 network 103 could send device 101 a separate message (not depicted in FIG. 2) to query or request for the ID.K.device 101*i* in order to obtain the shared secret key K.device 101*k* for use in subsequent steps.

For other exemplary embodiments, both (i) network 103 and device 101 could use multiple different shared secret keys K.device 101*k* for the same user name 101*u* (such as depicted and described for the first box in device database 101*d* in FIG. 1*c* above) and (ii) the inclusion of an ID.K.device 101*i* within a message 205 and 207 could be omitted. For these embodiments, then in a step 210 then network 103 could (i) select an ID.K.device 101*i* for use with device 101 using a network database 103*d* as depicted and described above in connection with FIG. 1*c*, and (ii) send device 101 the selected ID.K.device 101*i* in a subsequent message. As one example, the selected ID.K.device 101*i* could be sent in a message 218 or 219, such that device 101 could use a received ID.K.device 101*i* to select and use a specific shared secret key K.device 101*k* from a device database 101*d* depicted and described in connection with FIG. 1*c* in order to conduct an AKA authentication or protocol 223. In other words, in exemplary embodiments, either a device 101 or a network 103 could use an ID.K.device 101*i* to select and mutually agree on a shared secret key K.device 101*k* for use in subsequent AKA protocol 223 steps.

A step 211 can include verifying that device 101 with the SUPI 101*a* is authorized to connect with MNO 102 and/or network 103. In a step 211, if device 101 is not authorized to connect with MNO 102 and/or network 103, then network 103 could send an error message to network 103 (for forwarding to device 101) and not proceed to the additional steps depicted in FIG. 2.

At step 212, network 103 can use the user name 101*u* from SUPI 101*a* to query network database 103*d* for a specific authentication algorithm 101*q* for use with device 101 in subsequent messages between network 103 and device 101. The authentication algorithm 101*q* from a step 212 could be a subset of authentication algorithms 101*q* transmitted in a message 202 described above. As depicted and described in connection with FIG. 1*c* above, a network database 103*d* could store supported or preferred authentication algorithms 101*q* for a device 101 using an identity or user name 101*u*. In a step 212, network 103 could use the plaintext user name 101*u* read from a decryption step 103*j* in order to select an authentication algorithm 101*q* for the device 101 based on the identity or user name 101*u*. For the exemplary embodiment depicted in FIG. 2, network 103 could use a step 212 to select either (i) an EAP-TLS authentication step 222 using PKI and certificates such as cert.device 101*c*, or (ii) an AKA authentication step 222 using authentication vectors 103*x* based on a K.device 101*k* for device 101. Other possibilities exist as well for different subsequent authentication steps or authentication schemes selected in a step 212 based on the SUPI 101*a* from SUCI 101*b* without departing from the scope of the present disclosure.

In an exemplary embodiment, the user name received in a SUCI 101*b* from message 207 in the value 204*a* could comprise the exemplary value of user name 101*u*-2 depicted in a network database 103*d* in FIG. 1*c*. The value of user name 101*u*-2 could be associated with a physical device #2 also as depicted in FIG. 1*c*. In a step 212, network 103 could use the plaintext user name 101*u*-2 to select an authentication algorithm 101*q* of "EAP-TLS". The authentication scheme or protocol 222 for other devices 101 and other protocols besides "EAP-TLS" or AKA could be selected in a step 212 as well.

For a first authentication scheme or protocol 222 selected in a step 212, network 103 can conduct a step 213 based on the selected authentication algorithm 101*q* of "EAP-TLS" using the user name 101*u*. For some exemplary embodiments, in a step 213, network 103 could query other servers or select a device certificate cert.device 101*c* in order to conduct a subsequent EAP-TLS authentication with device 101. For some exemplary embodiments, a device certificate cert.device 101*c* can be stored in a network database 103*d*. Network 103 can then send device 101 through MNO 102 a message 214, where the message 214 can comprise an EAP-TLS start command. A message 214 could also include a network identity 103*a* for device 101 to use when processing and sending a subsequent "Client Hello" request message to initiate the TLS session. The message 214 could also optionally include a TLS version number to use for the authentication protocol 222 comprising EAP-TLS. In exemplary embodiments, the message 214 for the command for device 101 to initiate an EAP-TLS session can specify parameters 101*f* for a post-quantum cryptography key encapsulation mechanism (KEM) as well as a post-quantum cryptography digital signature algorithm, such as those in Phase 2 of the MST PQC project.

For a first authentication scheme or protocol 222, device 101 could receive the message 214 and process the message 214 in a step 215. In step 215, device 101 can use cryptographic algorithms 101*x* depicted and described in connection with FIG. 1*a* as well as data from a device database 101*d* in order to process or generate a "Client Hello" message for MNO 102 and network 103. The device 101 can use the network identity 103*a* as a domain name or IP address or other network identifier as a destination of the generated "Client Hello". Note that the network identity 103*a* in a message 214 can be different than the network identity 103*a* transmitted by device 101 in a SUCI 101*b* in a message 205 above, although the two different network identities 103*a* could be related (such as both network identities 103*a* used by a network 103).

In a step 215, device 101 can use the parameters 101*f* in order to select supported cipher suites, TLS extensions, and digital signature algorithms for the "Client Hello" message. For example, TLS 1.3 assumes a basic level of common parameters and algorithms supported between devices and servers, such that a Client Hello can be properly supported by a server without requiring additional round-trips of data in order to negotiate parameters. But, the transition for devices and servers to support post-quantum cryptography may result in devices and servers using different cryptographic parameters and algorithms for a TLS session, and additional round-trips of packets or data may be required to negotiate compatible parameters.

By message 214 including a set of parameters 101*f*, which could specify post-quantum cryptography algorithms and parameters, device 101 could use the parameters 101*f* in a step 214 to select the cipher suites and algorithms specified as supported within the subsequent "Client Hello" transmitted from device 101 to network 103. As one example, parameters 101f in a message 214 could specify the use of Dilithium as a digital signature algorithm, and device 101 could subsequently include Dilithium within the TLS extensions for signature algorithms in the subsequent "Client Hello" message. In exemplary embodiments, the parameters 101f within a message 214 could specify at least one of Dilithium-1024×768-AES, Dilithium-1280×1024-AES, and Dilithium-1536×1280-AES, or the equivalent for a digital signature algorithm. The "Client Hello" from device 101 can include one of the specified digital signature algorithms in the parameters 101f from a message 214. As depicted in FIG. 2, the series of steps from a step 213 through a 215 can comprise a step 222 for using an EAP-TLS authentication algorithm, which could be specified for device 101 in a network database 103 by an authentication algorithm 101q value for device 101 using the SUPI 101a.

In an exemplary embodiment, the user name received in a SUCI 101b from message 207 in the value 204a could comprise the exemplary value of user name 101u-1 and also an identity for a shared secret key of ID.K.device 101i-1 depicted in a network database 103d in FIG. 1c. The value of user name 101u-1 could be associated with a physical device #1 also as depicted in FIG. 1c. In a step 212, network 103 could use the plaintext user name 101u-1 to select an authentication algorithm 101q of "AKA", which could represent a second authentication scheme or protocol 223 as depicted in FIG. 2.

For the second authentication scheme or protocol 223 selected in a step 212 comprising an AKA authentication, network 103 could conduct a step 216. At step 216, the network 103 can generate a random number and then using the random number generate an authentication vector 103x for device 101 using the shared secret key K.device 101k. For embodiments where device 101 uses a plurality of shared secret keys K.device 101k, a step 216 could comprise generating an authentication vector 103x for each of the different secret keys K.device 101k, depicted as auth. vectors 103x-1, 103x-2, etc. for a network database 103d in FIG. 1c above. Note that a step 216 for each of the possible different secret keys K.device 101k could be generated before MNO 102 receives a message 205 from device 101. In addition, the step 216 could be conducted before network 103 sends a selected authentication vector 103x-1 to MNO 102 in a message 218 below. Each different authentication vector 103x for different secret keys K.device 101k for device 101 could use a different random number generated by network 103.

For embodiments where device 101 uses a plurality of different keys K.device 101k for the same device identity or user name 101u, then device 101 could send an identity for the key K.device 101k comprising the identity ID.K.device 101i in a message 205. For some embodiments, the identity ID.K.device 101i could be within ciphertext 123 and part of the SUCI 101b. For other embodiments, the ID.K.device 101i could be external to SUCI 101b and sent outside or external to the SUCI 101b in a message 205. In a step 217a for the embodiments where device 101 uses a plurality of different keys K.device 101k for the same device identity or user name 101u, then a network 103 could use the ID.K.device 101i to select the corresponding authentication vector 103x generated in a step 216. As one example, using the data depicted for a database in FIG. 1c, the device #1 could send the message 205 with an ID.K.device 101i-2 in the value 204a.

The network 103 in a step 217a could use the ID.K.device 101i-2 and the network database 103d to select the corresponding shared secret key K.device 101k-2 and the authentication vector 103x-2. The resulting authentication vector 103x-2 for the ID.K.device 101i-2 and K.device 101k-2 (for device #1) could be sent to MNO 102 in a message 218. The message 218 could also include SUCI 101b so that MNO 102 can track which device 101 is associated with the message 218 (since device 101 sent the SUCI 101b in a message 205). The message 218 can also include the SUPI 101a or a plaintext value for the user name 101u, which could also comprise an IMSI or equivalent identifier.

For embodiments where device 101 uses a single K.device 101k for the same device identity or user name 101u, then device 101 could optionally omit sending an identity for the key K.device 101k comprising the identity ID.K.device 101i in a message 205. In other words, for embodiments where the user name 101u is uniquely bound to a single key K.device 101k, such as with LTE AKA authentication, then the use of an identity ID.K.device 101i could be omitted. For these embodiments, then network could conduct a step 217b instead of the step 217a in order to select at least the authentication vector 103x generated in step 216. As one example, using the data depicted for a database in FIG. 1c, the device #3 could send the message 205 without an ID.K.device 101i-5 in the value 204a. In a step 217b, network 103 could select the authentication vector 103x-5 for device #3 using the user name 101u from a message 205 (after decryption of the ciphertext 123 in a step 103j to convert SUCI 101b into SUPI 101a). Or, for a step 217b, network 103 could select the authentication vector 103x-5 for device #3 using the SUPI 101a-3 (after decryption of the ciphertext 123 in a step 103j to convert SUCI 101b into SUPI 101a). The resulting authentication vector 103x-5 for device #3 using SUPI 101a-3 could be sent to MNO 102 in a message 218.

After step 217a or step 217b, MNO 102 could receive the message 218, which could contain both (i) identity information for device 101 and (ii) the selected authentication vector 103x. The authentication vector 103x can include (i) the random number for the AV 103x from a step 216, an expected response value XRES, an authentication token value AUTN which can be used by device 101 with the key K.device 101k and random number to authenticate the network 103, and values for CK and CI generated using the key K.device 101k. An exemplary authentication vector 103x is described in ETSI TS 133 501 v15. The identity information could comprise the SUCI 101b sent in a message 205, so that MNO 102 could track which device the authentication vector 103x is associated with. The identity information in a message 218 could also include either (i) the SUPI 101a or (ii) the user name 101u, such as an IMSI value.

MNO 102 could store the authentication vector 103x for the device 101 and send device 101 a message 219 with at least the random number from a step 216 and the authentication token value from the authentication vector 103x. At a step 220a or 220b, device 101 could receive the message 219 and process the message 219 in order to generate a response. In exemplary embodiments where device 101 can use a plurality of different keys K.device 101k for a user name 101u with network 103, at a step 220a, device can use the shared secret key identity ID.K.device 101i sent in a message 205 to select the corresponding key K.device 101k from a device database 101d. Note that the shared secret key identity ID.K.device 101i could be sent as ciphertext 123 within a message 205. With the selected K.device 101k and the random number received in message 219, device 101 could process a response value RES. The response value could be calculated as specified in ETSI TS 133 501 v15. With the selected K.device 101k and the random number received in message 219, device 101 could process an expected AUTN value and verify the received AUTN value from a message 219 matches the internally calculated AUTN value.

In exemplary embodiments where device 101 can use a single share secret key K.device 101k for the user name 101u with network 103, at a step 220b, device can use the user name 101u to select or identify the key K.device 101k from a device database 101d for the user name 101u. With the selected or identified K.device 101k and the random number received in message 219, device 101 could process a response value RES. The response value could be calculated as specified in ETSI TS 133 501 v15. With the selected K.device 101k and the random number received in message 219, device 101 could process an expected AUTN value and verify the received AUTN value from a message 219 matches the internally calculated AUTN value. After a step 220a or 220b, device 101 could then send MNO 102 a message 221 in order to complete authentication with MNO 102. Device 101 and MNO 102 could then take additional steps to derive additional keys for encryption and message authentication as specified in ETSI TS 133 501 v15. As depicted in FIG. 2, the series of steps from a step 216 through a message 221 can comprise a step 223 for using an AKA authentication algorithm, which could be specified for device 101 in a network database 103 by an authentication algorithm 101q value for device 101 using the SUPI 101a.

FIG. 3

Figure 3:
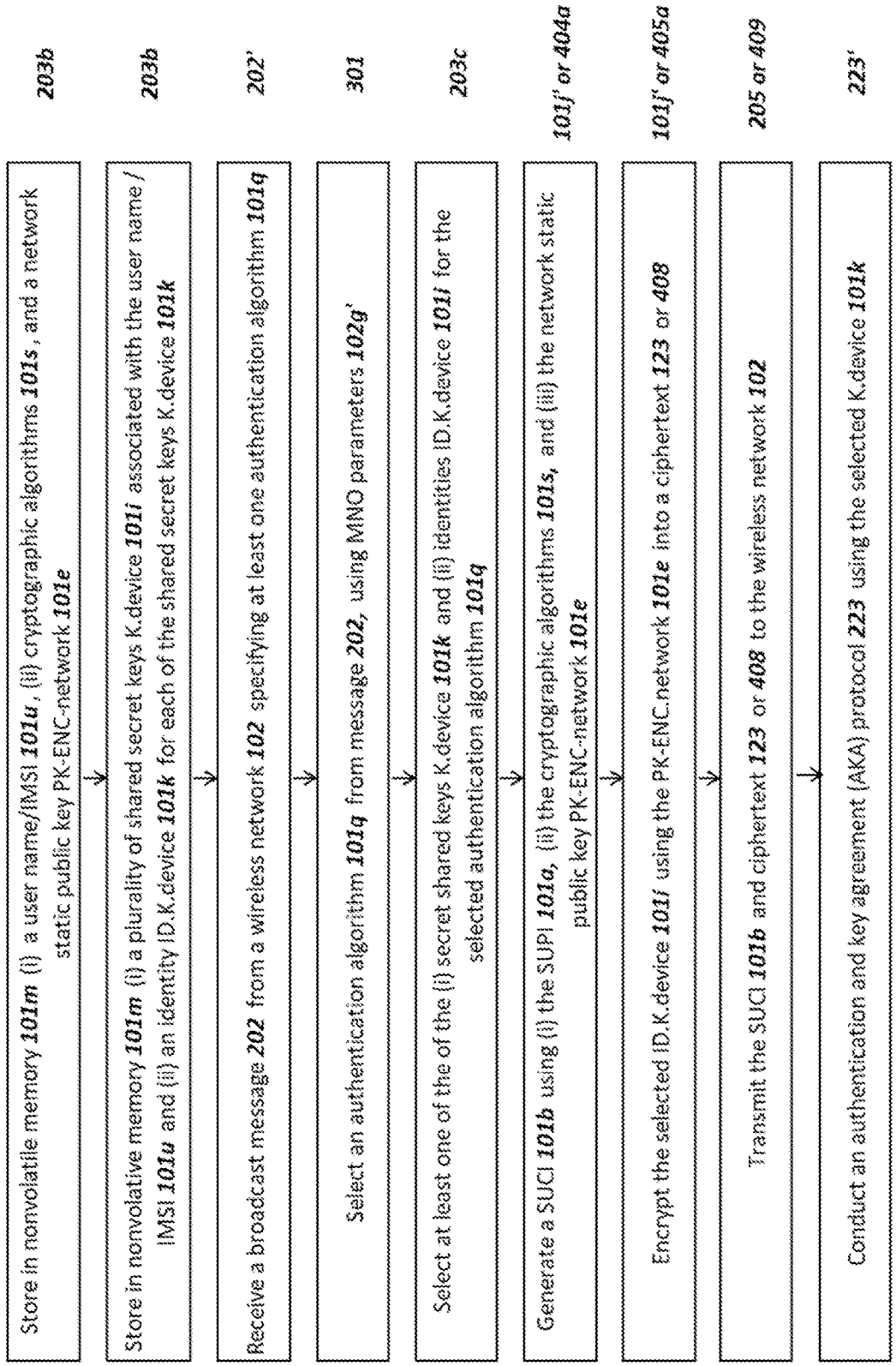
FIG. 3 is a flow chart illustrating exemplary steps for a device to (i) store multiple shared secret keys associated with device identity, (ii) select a shared secret key to conduct and AKA protocol, and (iii) encrypt an identity of the selected shared secret key, in accordance with exemplary embodiments.

FIG. 3 is a flow chart illustrating exemplary steps for a device to (i) store multiple shared secret keys associated with device identity, (ii) select a shared secret key to conduct and AKA protocol, and (iii) encrypt an identity of the selected shared secret key, in accordance with exemplary embodiments. FIG. 3 can comprise the steps and data used by a device 101 in a system 200 or system 500 below in order to (i) store a plurality of shared secret keys K.device 101k with associated identities ID.K.device 101i, (ii) select a shared secret key K.device 101k and identity ID.K.device 101i, (iii) encrypt the selected identity ID.K.device 101i into a ciphertext, and (iv) transmit the selected ID.K.device 101i as the ciphertext to a wireless network. After sending the selected ID.K.device 101i to the wireless network, a network 103 and the device 101 can conduct an authentication and key agreement (AKA) protocol 223 with the network 103 through the wireless network 102.

At step 203b, which is depicted and described in connection with FIG. 2 above, the device 101 can store in nonvolatile memory 101m (i) a user name/IMSI 101u, (ii) cryptographic algorithms 101s, and a network static public key PK-ENC-network 101e. Also at step 203b, the device 101 can store in nonvolatile memory 101m (i) a plurality of shared secret keys K.device 101i associated with the user name/IMSI 101u and (ii) an identity ID.K.device 101k for each of the shared secret keys K.device 101k. The step 203b can be conducted before device 101 receives a broadcast message 202 from wireless network 102, such as during a configuration step for device 101 by a device manufacturer or a device owner, or a device provider 104.

At step 202', device 101 can receive a broadcast message 202 from a wireless network 102 specifying at least one authentication algorithm 101q. A broadcast message 202 was depicted and describe in connection with FIG. 2 above. Note the broadcast message 202 can also include MNO parameters 102g', which were also depicted and described in connection with FIG. 2 above. The authentication algorithm 101q, which could specify different AKA algorithms such as 5G AKA, 5G AKA' (e.g. EAP-AKA), or EAP-TLS authentication and other possibilities exist as well. The MNO parameters 102g' could specify exemplary values such as a key length in bits for device 101 to use for a key K.device 101k, secure hash algorithms for use with asymmetric encryption 101j', an identity or algorithm for network static public key PK-ENC.network 103, and other possibilities exist as well without departing from the scope of the present disclosure.

At step 301, device 101 can select an authentication algorithm 101q from message 202, using MNO parameters 102g'. Although step 301 was not depicted in FIG. 2, a step 301 could be conducted after receipt of a message 202 and before device 101 sends a message 205 in FIG. 2 or a message 501 as depicted and described in connection with FIG. 5 below. In an exemplary embodiment, authentication algorithms 101q and MNO parameters 102g' in message 202 could specify the network 103 associated with wireless network 102 could support both (i) an AKA protocol 223 using a shared secret key K.device 101k (according to parameters 102g') and (ii) an EAP-TLS protocol 222 using a device certificate cert.device 101c. FIG. 3 can depict device 101 selecting the AKA protocol 223 in a step 301.

At step 203c, device 101 can select at least one of the of the (i) secret shared keys K.device 101k and (ii) identities ID.K.device 101i for the selected authentication algorithm 101q, where the selected authentication algorithms 101q was selected in a step 301 above. A step 203c was depicted and described in connection with FIG. 2 above. Note that in a step 203c, device 101 could also select multiple keys K.device 101k and identities ID.K.device 101i, and the subsequent steps of encrypting the selected ID.K.device 101i, such into ciphertext 123 or 408 could include the multiple identities ID.K.device 101i. A network 103 could decrypt the ciphertext 123 or 408 and select one of the multiple ID.K.device 101i and specify at a later step such as in message 219 or before message 219 that device 101 use the ID.K.device 101i and associated shared secret key K.device 101k for an AKA step 223.

At step 101j' or step 404a, device 101 can generate a SUCI 101b using (i) the SUPI 101a, (ii) the cryptographic algorithms 101s, and (iii) the network static public key PK-ENC-network 101e. A step 101j' is depicted and described in connection with FIG. 2 and FIG. 1b above, and can comprise the device 101 conducting an asymmetric encryption of at least the user name 101u or IMSI portion of the SUPI 101b into a ciphertext 123. A step 404a is depicted and described in connection with FIG. 4 and FIG. 5 below, and can comprise the device 101 conducting a KEM with the network static public key PK-ENC-network 101e in order to derive a shared secret M 401, and then the shared secret M 401 can be used to encrypt the he user name 101u or IMSI portion of the SUPI 101b into a ciphertext 406. The selection for the use of a step 101j' or 404a can be specified by network 102 or determined by device 101 based on authentication algorithms 101x or MNO parameters 102g' received in a message 202.

At step 101j' or step 405b, device 101 can encrypt the selected ID.K.device 101i using the PK-ENC.network 101e into a ciphertext 123 or 408. A step 101j' is depicted and described in connection with FIG. 2 and FIG. 1b above, and can comprise the device 101 conducting an asymmetric encryption of at least the selected ID.K.device 101i from a step 203c above into the ciphertext 123. A step 405b is depicted and described in connection with FIG. 4 and FIG. 5 below, and can comprise the device 101 using the shared secret key M 401 from the KEM 101j''' in order to encrypt the selected ID.K.device 101i using the PK-ENC.network 101e into a ciphertext 408. The selection for the use of a step 101j' or 405b can be specified by network 102 or determined by device 101 based on authentication algorithms 101x or MNO parameters 102g' received in a message 202.

At step 205 or 409, device 101 can transmit the SUCI 101b and ciphertext 123 or 408 to the wireless network 102. The step 205 can comprise sending the message 205 with ciphertext 123 as depicted and described in connection with FIG. 2 above. Note that the ciphertext 123 can include at least both the encrypted user name 101u or encrypted IMSI and the selected ID.K.device 101i, which is depicted and described in connection with FIG. 1b above. In some embodiments, the ciphertext 123 could comprise separate portions, such that device 101 first asymmetrically encrypts the user name 101u into a first portion of ciphertext 123 and then device 101 asymmetrically encrypts the selected ID.K.device 101i into a second portion of ciphertext 123 and the two portions could both be sent separately but together comprise a ciphertext 123. The step 409 can comprise the device 101 sending the message 409 as depicted and described in connection with FIG. 4 below. Note that the ciphertext 408 in a message 409 can include the encrypted user name 101u or encrypted IMSI. The selection for the use of a step 205 or 409 can be specified by network 102 or determined by device 101 based on authentication algorithms 101x or MNO parameters 102g' received in a message 202.

At step 223', device 101 can conduct an authentication and key agreement (AKA) protocol 223 using the selected K.device 101k. The AKA protocol 223 for device 101 and network 103 are depicted and described in connection with FIG. 2 above and FIG. 5 below. Note that the selected K.device 101k can be specified by device 101 and determined by network 103 using the associated ID.K.device 101i for the selected K.device 101k that was transmitted to wireless network 102 in either (i) the ciphertext 123 from FIG. 2 and FIG. 1c, or (ii) the ciphertext 408 from FIG. 4 and FIG. 5 below. In other words, a specific K.device 101k for device 101 to use with an AKA protocol 223 can be determined by network 103 and device 101 based on the associated ID.K.device 101i transmitted in either ciphertext 123 from FIG. 2 and FIG. 1c or ciphertext 408 from FIG. 4 and FIG. 5 below.

FIG. 4

Figure 4:
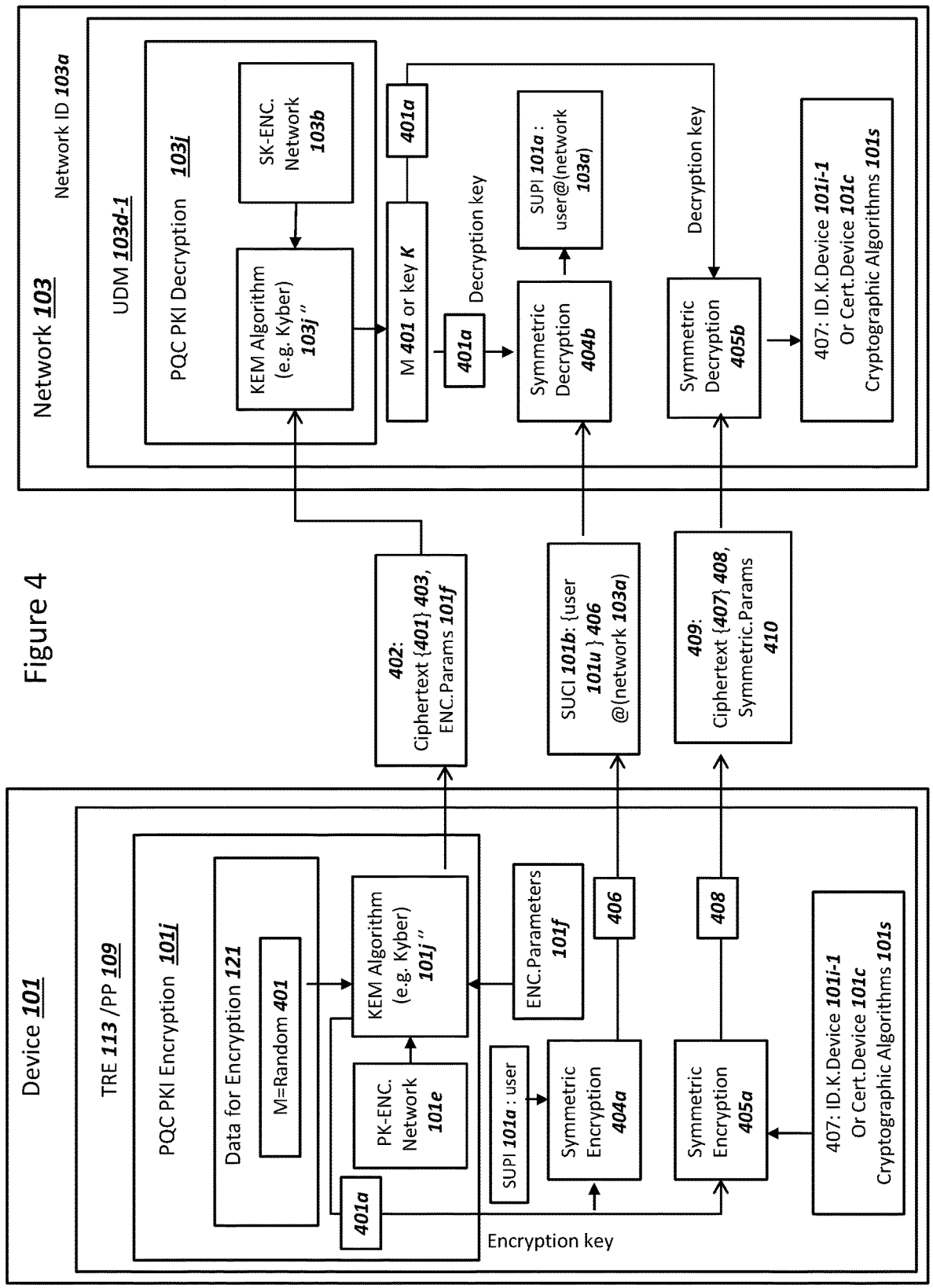
FIG. 4 is a flow chart illustrating exemplary steps using PKI keys, parameters, and data input for (i) a device to encrypt a ciphertext with the device identity and (ii) a network to decrypt the ciphertext, in accordance with exemplary embodiments.

FIG. 4 is a flow chart illustrating exemplary steps using PKI keys, parameters, and data input for (i) a device to encrypt a ciphertext with the device identity and (ii) a network to decrypt the ciphertext, in accordance with exemplary embodiments. FIG. 4 depicts exemplary steps for a device to generate or encrypt a random number comprising a key M using key encapsulation mechanism (KEM) and for a network to decrypt ciphertext 403 in order to read or derive the key M. Key M can comprise a shared secret key for both the device 101 and network 103 to process symmetric ciphering algorithms. The key M can be used with a symmetric ciphering algorithm 404 such as AES in order to convert the SUPI 101a into a SUPI 101b. The key M can be used with a symmetric ciphering algorithm 405 in order to covert a plaintext 406 into a ciphertext 408 (at the device 101) and convert the ciphertext 408 into a plaintext 406 at network 103.

In some exemplary embodiments, the use of a TRE 113 and PP 109 could be omitted, and the generation of a ciphertext 403 by device 101 could be performed or conducted within a processor 101p. The asymmetric encryption step or function 101j is also depicted as KEM Algorithm 101j''' in FIG. 4. The step 101j''' could comprise public key encryption using a post-quantum cryptographic algorithm. Note that the public key encryption in FIG. 4 may use the full key exchange mechanism specified by the PQC protocols, such as the agreement of a random shared secret M with a value with 256 bits in length. The following example within FIG. 4 will follow the steps for the Kyber algorithm within the PQ-Crystals project and proposal submitted to NIST, but other and different cryptographic algorithms could be utilized as well. In exemplary embodiments, the PQC KEM algorithm 101j''' depicted in FIG. 4 and described below could comprise the "Classic McEliece" algorithm submitted for the MST PQC standardization project, including the Classic McEliece algorithm with parameters such as, but not limited to, mceliece460896, mceliece6688128f, and mceliece6960119.

In an exemplary embodiment, the PQC PKI encryption step 101j could follow the encryption steps specified by the Kyber algorithm. In the paper "CRYSTALS—Kyber: a CCA-secure module-lattice-based KEM" (referred to herein as Kyber paper), the message "m" can be the key M 401 which is 256 bits in length for this embodiment. The step 101j''' depicted in FIG. 4 can comprise the function/step of "Kyber.Encaps" with the public key PK.ENC.network 101e, which is also depicted as "KEM Algorithm". The parameters of ENC.parameters 101j could be a row from Table 1 of the Kyber paper such as Kyber768. The output of step 101j''' and "Kyber.Encaps" can be the value "c" in the Kyber paper or ciphertext 403 in FIG. 4. The length of "c" and ciphertext 403 can be an exemplary 1152 bytes. Note that the function Kyber.Encaps may be used in exemplary embodiments for asymmetric encryption of the key M 401. Thus, in exemplary embodiments, encryption step 101j and 101j''' can use the CCA-secure KEM portion of PQC algorithms.

Device 101 can include a tamper resistant element 113 with a primary platform 109, where the primary platform 109 generates a random number which can comprise key M 401. The key M can be input into a post-quantum cryptography KEM 101j''' such as Kyber with the PK-ENC.network 101e in order to generate ciphertext 403. Although FIG. 4 depicts the KEM used by both device 101 and network 103 as Kyber, another KEM supporting post-quantum cryptography could be used as well, such as any of the KEM identified in Round 2 of the MST PQC standardization project. Device 101 can send network 103 via MNO 102 the ciphertext 403 via a message 402 (which could be a message equivalent to message 205 in FIG. 2). In exemplary embodiments, the asymmetric ciphertext 403 can include the key M 401. Message 402 can also include a value identifying or specifying the use of encryption parameters 101f used to process the message 402 and ciphertext 403.

A network 103 with the network identity 103a could use a server 111 to receive the message 402 with asymmetric ciphertext 403 and a value specifying parameters 101f from a wireless network 102. The network 103 could operate a Unified Data Management (UDM) to record PKI keys and process the received message 403. A UDM for network 103 was also depicted and described above in connection with FIG. 1a and also FIG. 1b. The network 103 can operate or process a PQC PKI Decryption function 103j (depicted in FIG. 4 as KEM Algorithm 103j''') which can convert the asymmetric ciphertext 403 portion of message 402 into a key M 401 via the KEM. The network could also use the parameters 101f to conduct the PQC PKI Decryption function 103j in a manner compatible with device 101 and supporting the use of SK-ENC.network 103b.

The network 103 can input the asymmetric ciphertext 403 into the decryption step 103j'' in order to convert the ciphertext to the key M 401 and complete the KEM in order to generate a key K for subsequent input into a HDKF 401a. For embodiments that use the PC-Crystals algorithms and Kyber, then the decryption step 103j'' can comprise the step "Kyber.Decaps" from the Kyber paper, which is also depicted as "KEM Algorithm". Decryption step 103j'' can use the network static secret key SK.ENC.network 103b to determine a key M 401 with extremely high probability (with errors changes much less than one in a billion). In other words, although a successful decryption step 103j'' can fail occasionally, the failure can be rare enough not to have a practical or meaningful affect. After successful decryption of asymmetric ciphertext 403 and processing of the plaintext in order to derive or determine the key M 401 via the KEM mechanism, the network 103 can use the share secret key M 401 to generate a key K for subsequent processing and generation of an encryption key and a MAC key for decryption steps and verification of MAC codes.

Both network 103 and device 101 can use a PQC KEM function that both (i) converts the ciphertext 403 into the message or key M 401 and (ii) uses a hash-based KDF in order to generate an encryption key and also a message authentication code (MAC) key from the message of key M 401. The hash-based KDF used by both the network 103 and device 101 is depicted in FIG. 4 as a key derivation function 401a. Although the key derivation function 401a is depicted as external to the KEM encaps function 101j'' and the KEM decaps function 103j'', in exemplary embodiments a key derivation function can be included within the KEM encaps function 101j'' and the KEM decaps function 103j'' in order to output a pseudo-random key K instead of the key M. In other words, although the output of a random message or key M 401 is depicted as output or external to KEM decaps function 103j'' in FIG. 4, in exemplary embodiments the random message of key M 401 is not directly output from the KEM decaps function 103j'', but rather the key M 401 is determined by the KEM decaps function 103j'' and then the key M is converted into a single key K. Likewise, the KEM encaps function 101j'' can generate or output a single key K instead of the random message or key M 401. The depicted separate and second hash-based key derivation function 401a can accept input of the key K output by both KEM encaps function 101j'' and the KEM decaps function 103j'' in order to generate the encryption key and also a message authentication code (MAC) key from the message of key M 401.

In other words, random data for M 401 can be input into KEM encaps function 101j'' in order to generate and output a key K (which can comprise the depicted output being input into KDF 401a in FIG. 4 for device 101). The KDF 401a can generate an encryption key and message authentication code (MAC) key for use with symmetric encryption. Likewise, the random data for M 401 determined by the KEM decaps function 103j'' from the ciphertext 403 can be used to generate the same key K, where the key K is depicted for a network 103 in FIG. 4. The key K can be input into key derivation function 401a in order to derive the same encryption key and message authentication code (MAC) key as derived by the device 101. Network 103 can input the encryption key and MAC key generated from the KDF 401a into symmetric decryption functions as depicted in FIG. 4.

After generation of an encryption key and MAC key by device 101 from the output of a key derivation function 401a, the keys can be input into a symmetric ciphering algorithm 404a for encryption in order to convert the user name 101u portion of a SUPI 101a into a symmetric ciphertext 406. Symmetric ciphering algorithm 404a and 405a below can include the use or an initialization vector (IV), which could comprise a random number. The initialization vector could be sent as plaintext or metadata along with the ciphertext, and in this manner the ciphertext could change over time (and with each SUCI 101b), which is preferred since the encrypted SUPI 101a could remain the same, but the ciphertext 406 (or 408 below) should change even though the plaintext data transmitted may be static. This avoids a third party seeing the ciphertext 406 or 408 from being able to track the sender. The ciphertext 406 can include MAC codes generated using the MAC key for message authentication. The device 101 can append the network identity 101a as plaintext for a realm portion of a NAI value, and the combination of ciphertext 406 and the realm can comprise the SUCI 101b. Device 101 can send the network 103 via MNO 102 the SUCI 101b.

The network 103 can receive the SUCI 101b. Network 103 can use the key M 401 and the key derivation function 401a such as the hash-based KDF in order to generate the encryption key and also the message authentication code (MAC) key. The keys can be input into a symmetric ciphering algorithm 404b for decryption in order to convert ciphertext 406 portion of the SUCI 101b into a plaintext user name 101u. The network 103 could use the MAC key from a HKDF 401a in order to verify message integrity for the ciphertext 406. The output of a symmetric ciphering algorithm 404b for decryption can be the SUPI 101a for device 101.

Device 101 can also record plaintext data 407 for network 103 in addition to the SUCI 101b. In exemplary embodiments, the plaintext data 407 can comprise an identity of a shared secret key ID.K.device 101i or a certificate of device 101 cert.device 101c. The use of an identity of a shared secret key ID.K.device 101i can be associated with the use of a step 223 in FIG. 2 for AKA security, and the use of a certificate of device 101 cert.device 101c can be associated with the use of a step 222 in FIG. 2 for EAP-TLS security. Additional data could be in the plaintext data 407 as well, such as, but not limited to, cryptographic algorithms 101s supported by device 101, cryptographic parameters 101x supported by device 101, information for device provider 104 associated with device 101, operating system or firmware parameters for device 101, an identity and/or firmware version for TRE/PP 109, a random number 101n, and other possibilities exist as well without departing from the scope of the present disclosure.

Device 101 can use (i) the encryption key and also the message authentication code (MAC) key generated by the HKDF 401a with (ii) a symmetric ciphering algorithm 405b for encryption in order to convert the plaintext data 407 into a ciphertext 408. Device 101 can send network 103 a message 409 with the ciphertext 408 to network 103 via MNO 102. The message 409 can also include symmetric ciphering parameters 410 associated with symmetric ciphering algorithms 405a and 405b. Or, the symmetric ciphering parameters 410 could be specified in MNO parameters 102g and can be omitted from the message 409. Note that in some exemplary embodiments, the use of an identity for a shared secret key of ID.K.device 101i could be omitted from plaintext data 407, such as if network 103 selects the use of an EAP-TLS authentication and protocol 222 as depicted and described in connection with FIG. 2 above.

Network 103 can receive the message 409 with the ciphertext 408 and symmetric ciphering parameters 410. Network 103 can use (i) the encryption key and also the message authentication code (MAC) key generated from the secret shared key M 401 and the HKDF 401a and (ii) the symmetric ciphering algorithm 405b for decryption, and (ii) symmetric ciphering parameters 410 in order to convert the ciphertext 408 into a plaintext data 407. Network 103 can read the plaintext values from data 407 and read (i) a shared secret key identity ID.K.device for use with a step 223 depicted and described in connection with FIG. 2 above, or (ii) a device certificate of cert.device 101c in order to conduct a step 223.

Note that network 103 can also conduct a certificate verification step on the device certificate cert.device 101c after the decryption step 405b. Network 103 could verify a digital signature in cert.device 101c from a certificate issuer in order to trust the device certificate. Upon verification of the device certificate cert.device 101c, network 103 could conduct the steps 223 for EAP-TLS authentication as depicted and described in connection with FIG. 2 and FIG. 5. As mentioned above, the plaintext data 407 could include other data such as cryptographic algorithms 101s, cryptographic parameters 101x, firmware or OS version numbers for device 101, and other values are possible as well. After a decryption step 405b, network 103 could check the plaintext data 407 is supported by network 103 and other processing steps on the plaintext data 407 is possible as well.

FIG. 5

FIG. 5 is a simplified message flow diagram illustrating an exemplary system with exemplary data sent and received by a device, a mobile network operator, and a network, in accordance with exemplary embodiments. System 500 can include a device 101, a mobile network operator (MNO) 102, and a network 103. The nodes or entities within system 500 were also depicted and described in connection with FIG. 1a and FIG. 2 above, where FIG. 5 depicts exemplary steps for the nodes and exemplary message flows between the nodes using the steps depicted in FIG. 4. Although a single device 101, MNO 102, and network 103 are depicted in a system 500, a system 600 could include a plurality of each of the depicted nodes connected via an IP network 107. In addition, data recorded for device 101 and network 103 depicted and described above in FIG. 1a can be recorded in the device 101 and network 103 depicted in FIG. 5 before the steps and message flows are conducted in FIG. 5.

The subsequent description of steps and messages will focus on differences from FIG. 2, where some additional or different steps can be conducted in a system 500 compared to the system 200 in FIG. 2. In summary, a system 500 can use the post quantum cryptography KEM in order for the device 101 and network 103 to share a secret key M 401 and then use the shared secret key M 401 for encryption and decryption. As in a system 200, in order to support authentication of devices 101 with network 103, a MNO 102 could establish a secure session 201 with network 103.

Device 101 could conduct step 203a for manufacturing and configuration as described in FIG. 2. Device 101 could conduct step 203b for powering on, loading firmware and begin operating as described in FIG. 2. MNO 102 can send a broadcast message 202 as described in FIG. 2. Device 101 can conduct the steps 203b, 203c, and 204 as described in FIG. 2. Device 101 can then derive a random number comprising the key M 401 as depicted and described in connection with FIG. 4 above. Device 101 can then conduct a KEM 101j" using the PK-ENC.network 101e as depicted and described in connection with FIG. 4 above. Device 101 can then generate an asymmetric ciphertext 403 which can be used by network 103 with the secret key SK-ENC.network 103b in order for the network to securely process the same key M 401 as device 101. Device 101 can use a symmetric ciphering algorithm 404a with a HKDF 401a of the key M 401 (or a key K generated by the KEM using the key M 401) in order to generate a SUCI 101b, where the SUCI 101b include a ciphertext 406 of the user name 101u. Device 101 can use a symmetric ciphering algorithm 405a with the HKDF 401a of the key M 401 (or key K generated by the KEM using key M 401) in order to generate a ciphertext 408. The plaintext 407 for a ciphertext 408 was depicted and described in connection with FIG. 4.

Device 101 can then send MNO 102 a message 501, where the message 501 can include the ciphertext 403 for the key M 401, a value specifying the use of encryption parameters 101f, a value 204a comprising the SUCI 101b, where the SUCI 101b includes a ciphertext 406 of the user name 101u, a ciphertext 408 of the plaintext 407 (such as, but not limited to, an ID.K.device 101i or a device certificate cert.device 101c), and symmetric encryption parameters 410. MNO 102 can conduct a step 206 in order to forward data from the message 501 to network 103. A step 206 for MNO 102 was depicted and described in connection with FIG. 2 above.

MNO 102 can send network 103 a message 502, where the message 502 can include data from the message 501. Network 103 can receive the message 502 comprising ciphertext 403 for the key M 401, a value specifying the use of encryption parameters 101f, a value 204a comprising the SUCI 101b, where the SUCI 101b includes a ciphertext 406 of the user name 101u, a ciphertext 408 of the plaintext 407 (such as, but not limited to, an ID.K.device 101i or a device certificate cert.device 101c), and symmetric encryption parameters 410. Network 103 can then conduct steps to process the message 502.

At step 208, the AUSF 103b can read and process the plaintext data in the realm for SUCI 101b in value 204a. As depicted in FIG. 2, for some exemplary embodiments the realm for SUCI 101b in a value 204a can comprise the network ID 103a. A step 208 can include AUSF 103b storing SUCI 101b in a network database 103d for subsequent use in identifying device 101.

Network 103 can then conduct a series of steps in order to process the message 207. At step 209, network 103 can read the plaintext network ID 103a in SUCI 101b and use network database 103d in order to select (i) secret key SK-ENC.network 103b and (ii) any associated parameters for ENC parameters 101f that may be needed for an asymmetric decryption function 103j. A network 103 can also read the received parameters 101f from a message 207 in a step 209. For some embodiments, a network identity 103a can be uniquely associated with secret key SK-ENC.network 103b and (ii) ENC Parameters 101f. Or, in some embodiments, the parameters 101f from messages 205 and 207 can include a value or identity for a PK-ENC.Network 101e stored by device 101, and in a step 209 network 103 can use a network database 103d as depicted in FIG. 1c to select the SK-ENC.network 103b.

At step 103j", network 103 can conduct the KEM function to process the asymmetric ciphertext 403 with the selected SK-ENC.network 103b in order to read or process the plaintext key M 401. Part of the KEM decaps function 103j can be generating a key K from the plaintext key M 401. A KEM step 103j" was depicted and described in connection with FIG. 4 above. Network 103 can use a symmetric ciphering algorithm 404b for decryption with a HKDF 401a of the key M 401 (or key K output from the KEM decaps function 103j) in order to decrypt the SUCI 101b into a SUPI 101a, where the SUCI 101b include a symmetric ciphertext 406 of the user name 101u. The SUPI 101a from a step 404b can comprise the plaintext user name 101u. Network 103 can use a symmetric ciphering algorithm 405b with the HKDF 401a of the key M 401 (or key K from the KEM 103j''') in order to convert ciphertext 408 into plaintext 407. The plaintext 407 for a ciphertext 408 was depicted and described in connection with FIG. 4.

Note that for some exemplary embodiments, all of PK-ENC.network 103b, SK-ENC.network 103b, ENC parameters 101f could specify the use of elliptic curve cryptography (ECC) algorithms and be compatible with either (i) the elliptic curve integrated encryption scheme (ECIES) as currently specified in ETSI TS 133 501 v15, or (ii) a key exchange algorithm based on Supersingular Elliptic Curve Isogeny, which is also referred to as "SIKE" in the NIST PQC project.

For the embodiments with ECIES, then the KEM step 103j''' could be replaced with an elliptic curve Diffie-Hellman (ECDH) key exchange algorithm, such that device 101 (i) derives a device ephemeral elliptic curve public and private key according the parameters 101f, and (ii) sends the device ephemeral public key with a message 501 and network 103 receives the device ephemeral public key with a message 502. For the embodiments with SIKE, then the KEM step 103j''' could be replaced with a key exchange algorithm, which could be a Supersingular Elliptic Curve Isogeny based algorithm with the same steps (i) and (ii) in the previous sentence.

For either ECDH or SIKE, network 103 can determine a shared secret using the device ephemeral public key and the network static private key SK-ENC.network 103b, where the shared secret can be equivalent to key M 401 in FIG. 4. Device 101 can determine the shared secret using the device ephemeral private key and the network static public key PK-ENC.network 103b. The device can encrypt the ciphertext 406 and 408 using the shared secret key M 401 from the ECDH or SIKE and optionally the output of a HKDF 401a (in FIG. 4 above) over the key M 401. The network can decrypt the ciphertext 406 and 408 using the shared secret key M 401 from the ECDH or SIKE and optionally the output of the of a HKDF 401a. In this manner, these embodiments of the present invention which use either (i) the traditional ECIES specified in current 5G standards or (ii) SIKE with ECC public and private key pairs can also support features of the present disclosure. As one example, the ciphertext 408 (which can be encrypted and decrypted using ECDH or SIKE) can include an identity for a shared secret key K.device 101k of ID.K.device 101i. Or, the ciphertext 408 could include a certificate of the device comprising cert.device 101c.

Network 103 can then conduct a step 210 if an AKA authentication algorithm 101q is selected for device 101 from a network database 103d. For a step 210 in a system 500, the ID.K.device 101i can be read from plaintext 407 decrypted from ciphertext 408. The step 210 was depicted and described above in connection with FIG. 2. Or, if an EAP-TLS authentication is selected from a network database 103d, then Network 103 can conduct a step 503. The step 503 can comprise reading a device certificate of cert-.device 101c from the plaintext 407 generated by step 405b. A step 503 can also comprise network 103 verifying the device certificate 101c. A step 503 can also comprise network 103 processing data in plaintext 407 from ciphertext 408 in order to conduct subsequent communication and authentication with device 101. The plaintext 407 can include values specifying cryptographic algorithms 101s used by device 101, and network 103 could use the cryptographic algorithms 101s for processing data in subsequent communications with device 101.

Network 103 can then conduct step 211. A step 211 can include verifying that device 101 with the SUPI 101a is authorized to connect with MNO 102 and/or network 103. At step 212, network 103 can use the user name 101u from SUPI 101a to query network database 103d for a specific authentication algorithm 101q for use with device 101 in subsequent messages between network 103 and device 101. Steps 211 and 212 are depicted and described in connection with FIG. 2 above. Network 103 and device 101 can then conduct either steps 222 for EAP-TLS authentication or steps 223 for AKA authentication. The steps 222 for EAP-TLS authentication and 223 for AKA authentication were depicted and described in connection with FIG. 2 above. A different authentication and security scheme besides 222 for EAP-TLS and 223 for AKA could be selected in a step 212 in FIG. 5 and FIG. 2, without departing from the scope of the present disclosure. In summary, in a step 212, a network can select and begin the process and subsequent steps to authenticate a device and encrypt data using the encrypted data received with a SUCI 101b. The SUCI 101b can be processed using PQC algorithms instead of classical ECC algorithms as described herein

CONCLUSION

Various exemplary embodiments have been described above. Those skilled in the art will understand, however, that changes and modifications may be made to those examples without departing from the scope of the claims.

The invention claimed is:

1. A method for a device to securely authenticate with a wireless network, the method performed by the device, the method comprising:
   a) storing in nonvolatile memory a user name, cryptographic algorithms, a plurality of network static public keys, a plurality of pre-shared secret keys for the user name, and an identity for each of the pre-shared secret keys wherein the wireless network and device store at least one of the pre-shared secret keys before the device authenticates with the wireless network;
   b) receiving a broadcast message from the wireless network specifying (i) supported parameters for the cryptographic algorithms, and (ii) an identity for the network static public key;
   c) selecting (i) a pre-shared secret key and an identity of the pre-shared secret key using a device database and the parameters (ii) a network static public key form the plurality of network static public keys using the received identity for the network static public key;
   d) generating an asymmetric ciphertext for post-quantum cryptography and a key K using a key encapsulation mechanism (KEM) with the selected network static public key and the parameters;
   e) generating a symmetric ciphering key from the key K;
   f) generating a symmetric ciphertext of (i) a subscriber concealed identifier (SUCI) for the user name, and (ii) the selected identity of the pre-shared secret key, wherein the symmetric ciphertext is generated using the symmetric ciphering key;
   g) transmitting (i) the asymmetric ciphertext, (ii) the identity for the network static public key, and (iii) the symmetric ciphertext to the wireless network; and h) conducting an authentication and key agreement (AKA) with the wireless network using the selected pre-shared secret key for the selected identity of the pre-shared secret key.

2. The method of claim 1, wherein the parameters include a Classic McEliece algorithm, and wherein the KEM uses the Classic McEliece algorithm.

3. The method of claim 2, wherein the network static public key comprises a public key for the Classic McEliece algorithm.

4. The method of claim 1, wherein the identity of the shared secret key comprises a secure hash value over the shared secret key.

5. The method of claim 1, wherein a plaintext for the symmetric ciphertext of the subscriber concealed identifier (SUCI) comprises a subscriber permanent identifier (SUPI).

6. The method of claim 1, wherein the device stores the pre-shared secret key before the device communicates with the wireless network.

7. The method of claim 1, wherein the user name comprises an international mobile subscriber identifier (IMSI).

8. The method of claim 1, wherein the parameters include a Kyber algorithm, and wherein the KEM uses the Kyber algorithm.

9. The method of claim 8, wherein the network static public key comprises a public key for the Kyber algorithm.

10. The method of claim 1, wherein the device database comprises protected memory within a tamper resistant element for the device.

11. The method of claim 10, wherein the device database stores the plurality of pre-shared secret keys for each of a plurality of mobile network operators.

12. The method of claim 1, wherein the device uses a radio to transmit the asymmetric ciphertext and the symmetric ciphertext to a security anchor function (SEAF) of the wireless network.

13. The method of claim 1, wherein the device conducts the AKA by (i) receiving a random number from the wireless network and (ii) transmitting a response value generated using the selected pre-shared secret key and the random number.

14. The method of claim 1, wherein the wireless network (i) mutually derives the key K using the KEM and the asymmetric ciphertext, and (ii) mutually derives the symmetric ciphering key using the key K.

15. The method of claim 14, wherein the wireless network decrypts the symmetric ciphertext using the symmetric key, and wherein the wireless network selects an authentication vector for the AKA using the user name and the identity of the pre-shared secret key.

* * * * *